United States Patent
Lee et al.

(10) Patent No.: US 10,057,504 B2
(45) Date of Patent: Aug. 21, 2018

(54) DISPLAY DEVICE AND METHOD OF CONTROLLING THE SAME

(71) Applicant: SAMSUNG ELECTRONICS CO., LTD., Suwon-si (KR)

(72) Inventors: Bong-Geun Lee, Suwon-si (KR); Dong Hyun Kim, Seongnam-si (KR); Kil Soo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 298 days.

(21) Appl. No.: 14/809,681

(22) Filed: Jul. 27, 2015

(65) Prior Publication Data

US 2016/0100119 A1   Apr. 7, 2016

(30) Foreign Application Priority Data

Oct. 6, 2014 (KR) .................. 10-2014-0134082

(51) Int. Cl.
*H04N 5/262* (2006.01)
*H04N 13/128* (2018.01)
(Continued)

(52) U.S. Cl.
CPC ....... *H04N 5/2628* (2013.01); *H04N 13/0022* (2013.01); *H04N 13/0452* (2013.01);
(Continued)

(58) Field of Classification Search
CPC . G09G 2340/0442; H04N 5/64; H04N 7/0117
See application file for complete search history.

(56) References Cited

U.S. PATENT DOCUMENTS

| 5,999,660 A | 12/1999 | Zorin et al. |
| 2002/0118219 A1 | 8/2002 | Nally et al. |

(Continued)

FOREIGN PATENT DOCUMENTS

| CN | 1477597 A | 2/2004 |
| CN | 102479389 A | 5/2012 |

(Continued)

OTHER PUBLICATIONS

Communication dated Sep. 27, 2016 issued by The State Intellectual Property Office of P.R. China in counterpart Chinese Application 201510617146.5.

(Continued)

*Primary Examiner* — Towfiq Elahi
(74) *Attorney, Agent, or Firm* — Sughrue Mion, PLLC

(57) ABSTRACT

A display device and a method of controlling the same. The display device includes a display configured to display an image; and a controller configured to perform image processing on the displayed such that a radius of curvature of the displayed image and a radius of curvature of a visible image are different. The image can be enlarged to a maximum area providing in the display device by applying analogous viewing distance calculation method used in the curved display device with respect to the scaling of the image. Accordingly, the discontinuity of the image can be removed by providing continuous scaling, and the perspective, presence, viewing experience can be enhanced while adaptively correcting the brightness. The display device can display the image having the curvature that the user wants, and thus resemble the curved display device. Further, optical illusion of watching the three-dimensional image can be generated.

22 Claims, 23 Drawing Sheets

(51) Int. Cl.
    *H04N 13/356*     (2018.01)
    *H04N 13/398*     (2018.01)
    *H04N 13/00*     (2018.01)
    *H04N 13/04*     (2006.01)
    *H04N 21/431*     (2011.01)
    *H04N 21/485*     (2011.01)
    *H04N 21/81*     (2011.01)
    *H04N 5/64*     (2006.01)
    *H04N 7/01*     (2006.01)

(52) U.S. Cl.
    CPC ....... *H04N 13/0497* (2013.01); *H04N 13/128* (2018.05); *H04N 13/356* (2018.05); *H04N 13/398* (2018.05); *H04N 21/4318* (2013.01); *H04N 21/4854* (2013.01); *H04N 21/8146* (2013.01); *G09G 2340/0442* (2013.01); *H04N 5/64* (2013.01); *H04N 7/0117* (2013.01)

(56) References Cited

U.S. PATENT DOCUMENTS

| | | | |
|---|---|---|---|
| 2003/0085912 A1 | 5/2003 | Soo et al. | |
| 2003/0086026 A1 | 5/2003 | Kim | |
| 2004/0008191 A1* | 1/2004 | Poupyrev | G06F 3/011 345/184 |
| 2006/0033999 A1 | 2/2006 | Liu et al. | |
| 2006/0109391 A1* | 5/2006 | Huitema | G09G 3/3611 349/19 |
| 2006/0227416 A1* | 10/2006 | Balu | G03B 21/10 359/451 |
| 2012/0092363 A1* | 4/2012 | Kim | G06T 5/006 345/618 |
| 2012/0120498 A1* | 5/2012 | Harrison | G02B 3/08 359/630 |
| 2013/0278486 A1* | 10/2013 | Duerksen | G09G 3/34 345/55 |
| 2013/0321476 A1 | 12/2013 | Botzas et al. | |
| 2013/0329422 A1 | 12/2013 | Park et al. | |

FOREIGN PATENT DOCUMENTS

| | | |
|---|---|---|
| CN | 102645779 A | 8/2012 |
| EP | 1326435 A2 | 7/2003 |
| KR | 10-2010-0130344 A | 12/2010 |
| KR | 10-2011-0133422 A | 12/2011 |
| KR | 10-2014-0037301 A | 3/2014 |
| KR | 10-2014-0109168 A | 9/2014 |

OTHER PUBLICATIONS

O'Shea, et al., "Contrast as a Depth Cue", Vision Research, vol. 34, Issue No. 12, Jun. 1994, pp. 1595-1604, XP 002752184.

Bardel, W., "Depth Cues for Information Design", Carnegie Mellon University, May 2001, 34 pages total, http://www.luminantdesign.com/articles/Depth_Cues_for_Information_Design.pdf, XP 002752185.

Search Report dated Nov. 24, 2015, issued by the International Searching Authority in counterpart International Patent Application No. PCT/KR2015/007745 (PCT/ISA/210).

Search Report dated Dec. 22, 2015, issued by the European Patent Office in counterpart European Patent Application No. 15181853.1.

Communication dated Apr. 27, 2017 by the State Intellectual Property Office of P.R. China in counterpart Chinese Patent Application No. 201510617146.5.

* cited by examiner

FIG. 7B

| P11 | P12 | P13 | P14 | P15 |
|---|---|---|---|---|
| 0.7 | 0.8 | 0.9 | 1.0 | 1.1 |

FIG. 7C

| P11 | P12 | P13 | P14 | P15 |
|-----|-----|-----|-----|-----|
| 0.8 | 0.9 | 1.0 | 1.1 | 1.2 |

DISPLAY DEVICE AND METHOD OF CONTROLLING THE SAME

CROSS-REFERENCE TO RELATED APPLICATION

This application claims priority under 35 U.S.C. § 119 from Korean Patent Application No. 10-2014-0134082, filed on Oct. 6, 2014, in the Korean Intellectual Property Office, the disclosure of which is incorporated herein by reference in its entirety.

BACKGROUND

1. Field

A method and an apparatus consistent with exemplary embodiments broadly relate to a display device for improving viewing of an image by providing various image processing and a method of controlling the same.

2. Description of the Related Art

A display device is a device displaying visual and three-dimensional image information.

Recently, a flat panel display device is being developed, which has features in which a weight and a volume, which is a disadvantage of a cathode ray tube, are decreased, a required installation space is smaller, image implementation and planarization of a large screen is easy, and a variety of performance such as high-definition, etc. is excellent.

As a representative example of the flat panel display device, there are a liquid crystal display (LCD) device, an electro-luminescence display (ELD) device, a field emission display (FED) device, a plasma display panel (hereinafter referred to as "PDP"), a thin film transistor-liquid crystal display (TFT-LCD) device, a flexible display device, etc.

The display device may convert a format of an input image into a format capable of being displayed on the display device by controlling resolution, etc. of the input image.

That is, the display device controls the resolution of the image and a size of the image so as to be suitable for its own resolution.

When an aspect ratio of the image to be displayed is not identical to that of the display device, the image is enlarged and reduced in a specific direction and displayed on the display device.

That is, when the aspect ratio of the image to be displayed is not identical to that of the display device, discontinuity in an image for each section occurs, and an original image may be distorted.

Meanwhile, when displaying an image having resolution greater than that of the display device, a mobile display device or a small display device has a limitation.

For this reason, a scalable video coding method has been proposed.

The scalable video coding method is an encoding method capable of controlling image resolution, a frame rate, and a signal-to-noise ratio (SNR), etc. by cutting a portion of a bit stream according to a surrounding condition such as a transmission bit rate, a transmission error rate, a system resource, etc. with respect to a compressed bit stream.

The control of the resolution of the image in the scalable video coding method is limited to a method of performing up-scaling or down-scaling on the image at a predetermined size or an equal interval.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

Therefore, it is an aspect of exemplary embodiments to provide a display device for displaying a curved image on a flat panel display device, and a method of controlling the same.

It is another aspect of exemplary embodiments to provide a display device for displaying images having different curvatures on a curved panel display device, and a method of controlling the same.

It is yet another aspect of exemplary embodiments to provide a display device for controlling a scaling ratio based on brightness, and a method of controlling the same.

Additional aspects of exemplary embodiments will be set forth in part in the description which follows and, in part, will be obvious from the description, or may be learned by practice of exemplary embodiments.

In accordance with one aspect of exemplary embodiments, a display device, includes a controller configured to receive an image perform image processing of the received image such that a radius of curvature of the received image and a radius of curvature of an image to be displayed are different.

The display device may further include an input interface configured to receive input of the radius of curvature of the image to be displayed, wherein the controller is further configured to adjust a scaling ratio of the image based on the received radius of curvature.

The controller may correct brightness of the image based on the adjusted scaling ratio of the image to be displayed.

The controller may adjust the scaling ratio for each pixel of the image, and may correct the brightness.

The controller may brighten a pixel in response to the calculated scaling ratio being larger than a first ratio, and may darken the pixel in response to the calculated scaling ratio being smaller than a second ratio.

The controller may calculate the scaling ratio based on an angle for each pixel of an image to be displayed at a reference position and an angle for each pixel of the image to be displayed at the reference position, respectively.

The display may include a flat display panel or a curved display panel.

In accordance with yet another aspect of an exemplary embodiment, a display device, includes: a display configured to display an image; an input interface configured to receive input of a radius of curvature; and a controller configured to divide a display area of the display into a plurality of areas, and adjust a scaling ratio of each of the plurality of areas based on the input radius of curvature.

Each of the plurality of areas may be a pixel of the image.

The controller may confirm a reference position spaced apart by a predetermined distance from the display, calculate a visible angle between lines obtained by connecting each of boundary points of each pixel from the reference position, and obtain a scaling ratio of each pixel based on the calculated visible angles.

The controller may obtain a visible image corresponding to the radius of curvature, calculate a reference angle between lines obtained by connecting each of boundary points of any one pixel of the visible image from the reference position, and obtain the scaling ratio of each of the plurality of pixels based on the reference angle and the visible angle of each pixel.

The predetermined distance may be a radius corresponding to the radius of curvature, and the reference position may be a position spaced apart by the radius in a horizontal direction from the center position of the display.

The controller may correct brightness for each pixel based on the scaling ratio for each pixel.

The controller may calculate a brightness correction coefficient based on the calculated scaling ratio, and correct the brightness for each pixel based on the calculated brightness correction coefficient.

The controller may brighten a pixel in response to the calculated scaling ratio being larger than a first ratio, and darken the pixel in response to the calculated scaling ratio being less than a second ratio.

The controller may readjust the scaling ratios of the plurality of areas based on an average ratio of the scaling ratios of the plurality of areas.

The display may include a flat display panel.

The controller may control the flat display panel so that a visible image corresponding to the input radius of curvature is displayed.

The display may include a curved display panel having a predetermined radius of curvature.

The controller may perform control the curved display panel to display the visible image having a radius of curvature different from the predetermined radius of curvature of the curved display panel.

In accordance with yet another aspect of an exemplary embodiment, a method of controlling a display device, includes: receiving an input of a radius of curvature; obtaining a scaling ratio of each pixel of an image based on the input radius of curvature; adjusting the scaling ratio for each pixel based on the obtained scaling ratio of each pixel; and displaying an image having the input radius of curvature based on the adjusted scaling ratio.

The obtaining of the scaling ratio for each pixel may include: confirming a reference position spaced apart by a constant distance from the display; calculating a visible angle between lines obtained by connecting each of boundary points for each pixel from the reference position; and obtaining the scaling ratio of each of the plurality of pixels based on the calculated visible angle.

The method may further include: obtaining the visible image corresponding to the radius of curvature; calculating a reference angle between lines obtained by connecting each of boundary points of any one pixel of the visible image from the reference position; and obtaining the scaling ratio of each of the plurality pixels based on the reference angle and the visible angle for each pixel, wherein the predetermined distance is a radius corresponding to the radius of curvature, and the reference position is a position spaced apart by the radius in a horizontal direction from the center position of the display.

The method may further include: calculating a brightness correction coefficient for each pixel based on the calculated scaling ratio of each pixel; and correcting the brightness of each pixel based on the calculated brightness correction coefficient for each pixel.

The correcting of the brightness of each pixel may include: readjusting the scaling ratios of the plurality of areas based on an average ratio of the scaling ratios of the plurality of areas; and correcting the brightness for each pixel by applying the brightness correction coefficient to the each pixel in which the scaling ratio is readjusted.

The method may further include: readjusting the scaling ratios of the plurality of areas based on an average ratio of the scaling ratios of the plurality of areas.

The obtaining of the scaling ratio may include controlling the flat display panel to display the visible image corresponding to the input radius of curvature.

The obtaining of the scaling ratio may include control a curved display panel so that the visible image having a radius of curvature different from the predetermined radius of curvature is displayed.

BRIEF DESCRIPTION OF THE DRAWINGS

The above and/or other aspects will become more apparent and more readily appreciated from the following description of exemplary embodiments, taken in conjunction with the accompanying drawings, in which.

DETAILED DESCRIPTION OF EXEMPLARY EMBODIMENTS

Figure 1:
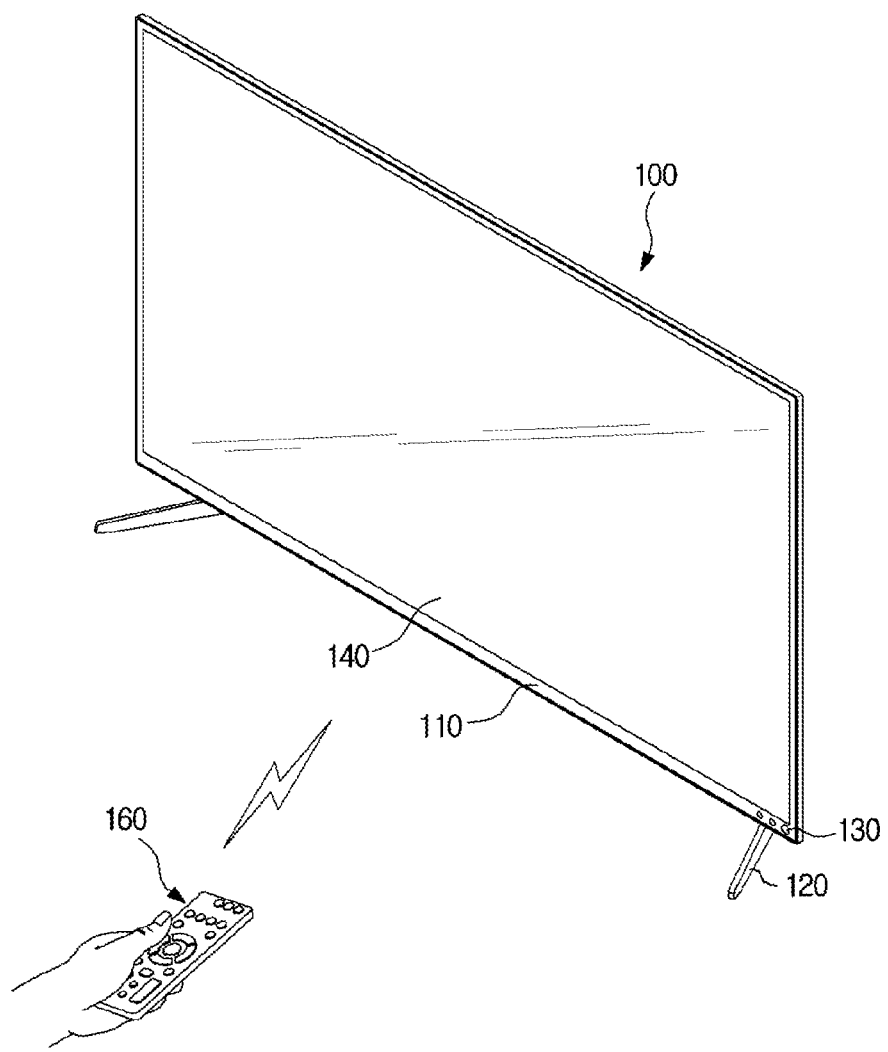
FIG. 1 is a diagram illustrating a display device according to an exemplary embodiment.

Reference will now be made in detail to exemplary embodiments, examples of which are illustrated in the accompanying drawings, wherein the same reference numerals are used to denote analogous elements throughout. The matters defined in exemplary embodiments, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure exemplary embodiments with unnecessary detail.

FIG. 1 is a diagram illustrating a display device according to an exemplary embodiment.

A display device 100 may be a device displaying an image such as a display of a mobile communication terminal such as a notebook computer, a smart phone, a tablet personal computer (PC), monitors of a television (TV) and a PC, etc. FIG. 1 illustrates a TV as the display device.

The display device 100 may include a body 110 forming a frame for the display device 100 and covering an area in which an image is not displayed, and a stand 120 installed on the bottom of the body 110.

The display device 100 may be installed on a wall by a bracket, etc., according to an exemplary embodiment.

According to an exemplary embodiment, the body 110 may include a cover covering a back surface of the area on which the image is displayed and a vessel covering edges of the area on which the image is displayed, and the cover and the vessel may be coupled to be detachable from each other.

The display device 100 may include the body 110, and include an input interface 130 configured to receive an input of an operation command from a user, and a display 140 installed inside the body 110 and installed so that a surface for displaying the image is exposed and for displaying the image thereon.

The input interface 130 may be arranged in or on the body 110, and may include a plurality of buttons.

Here, the plurality of buttons may include a power button, a channel/volume button, a screen adjustment button, etc.

The display 140 may include any one from among a liquid crystal display (LCD) panel, an electro luminescence display (ELD) panel, a field emission display (FED) panel, a plasma display panel, a thin film transistor-liquid crystal display (TFT-LCD) panel, an organic light emitting diode (OLED) display panel, and any display panel may be a flat display panel.

A sound output interface (not shown) configured to output a sound related to the image e.g., speakers, may be provided in the display device 100.

The display device 100 may perform remote communication with a remote controller 160, receive an operation signal obtained from a manipulation of the remote controller 160, and perform an operation based on the received operation signal.

That is, the display device 100 may further include a driving module 150 (shown in FIG. 2) for driving the display 140 in response to an operation command input to the input interface 130 and the remote controller 160, according to an exemplary embodiment. This will be described in further detail with reference to FIG. 2.

Figure 2:
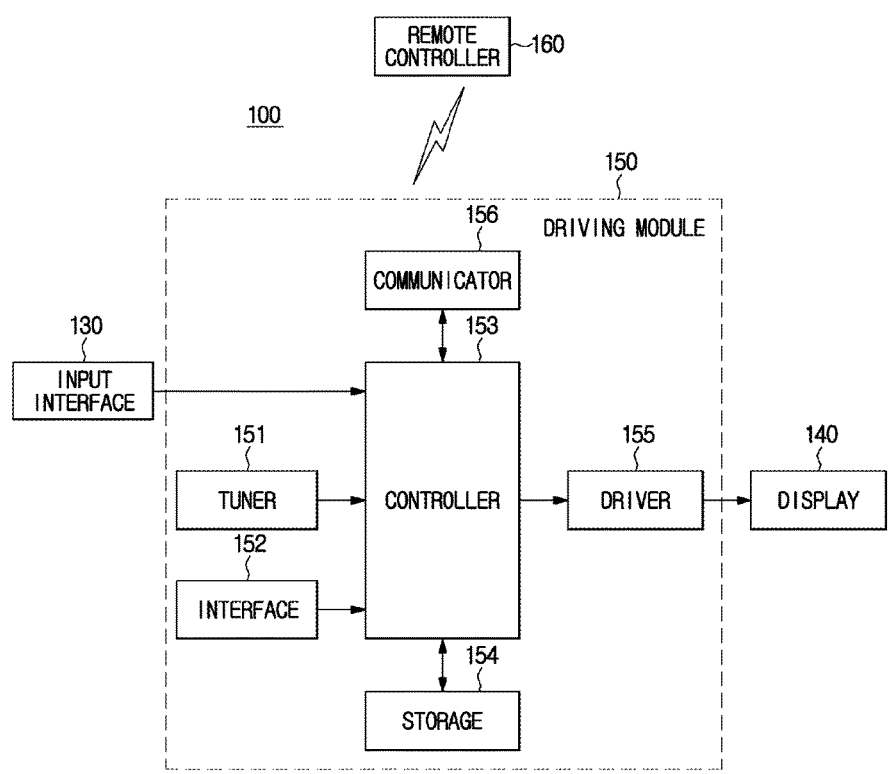
FIG. 2 is a diagram illustrating a control configuration of a display device according to an exemplary embodiment.

FIG. 2 is a diagram illustrating a control configuration of a display device according to an exemplary embodiment.

The input interface 130 may receive the input of the operation command of a user, and transmit a signal corresponding to the operation command to a controller 153.

Further, the input interface 130 may receive the operation command of selecting a normal mode in which a two-dimensional image is displayed, or a three-dimensional mode in which a three-dimensional image is displayed.

According to an exemplary embodiment, the normal mode may be a mode in which an image is two-dimensionally displayed by scaling a plurality of areas having a predetermined size configuring the image with the same ratio, and the three-dimensional mode may be a mode in which an image is three-dimensionally displayed by scaling a plurality of pixels configuring the image with different ratios.

The input interface 130 may receive a radius of curvature that a user wants, from the user.

According to an exemplary embodiment, when a visible image that the user sees is not a two-dimensional image but a curved image, a radius of curvature may be information for setting a curvature of the curved image.

The display 140 may display a video signal included in a broadcasting signal as an image, according to an exemplary embodiment.

The display 140 may display an image stored in a storage 154 or an image of an external device connected to an interface 152.

The display 140 may display the image to look in the user's eye three-dimensionally by scaling and displaying the plurality of pixels as the different ratios then when displaying the image in the three-dimensional mode.

Here, the image may include the plurality of pixels, and the plurality of pixels may have the same size.

Figure 3:
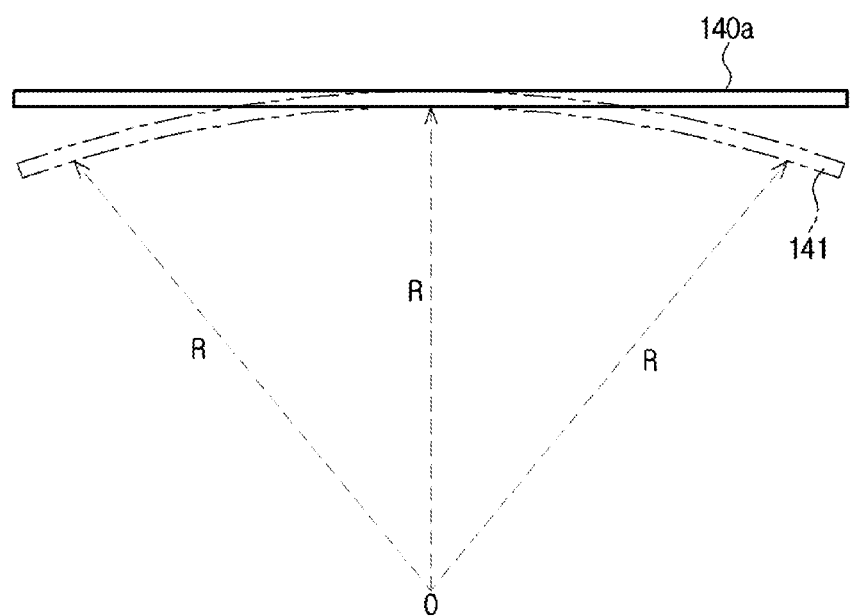
FIG. 3 is a diagram illustrating an image and a visible image displayed on a display panel of a display device according to an exemplary embodiment.

As shown in FIG. 3, a display 140a may display a visible image 141 having a radius of curvature in the three-dimensional mode.

Here, the radius of curvature may be a bending degree of a circle having a radius R from a center position O of the circle.

According to an exemplary embodiment, the display 140a may provide a visible effect like a curved display panel.

The driving module 150 may include a tuner 151, an interface 152, a controller 153, a storage 154, a driver 155, and a communicator 156.

The tuner 151 may select at least one frequency band, and receive a broadcasting signal transmitted from any one among a plurality of broadcasting stations.

That is, the tuner 151 may have at least one tuner, and select any one broadcasting signal using at least one tuner.

The broadcasting signal selected by the tuner 151 may be a digital broadcasting signal or an analog broadcasting signal.

The interface 152 may include a universal serial bus (USB) port, a video/audio port, a high definition multimedia interface (HDMI) port, etc., receive an image from an external device connected to the port, and transmit the received image to the controller 153.

The controller 153 may separate a video signal and an audio signal from the broadcasting signal received at the tuner 151, and process the separated video signal and audio signal.

More particularly, the controller 153 may demodulate the broadcasting signal selected in the tuner 151, and after separating and demodulating the video signal and the audio signal, convert each signal based on a signal processing standard, and output the converted signal.

The controller 153 may control output of the image and the sound based on a signal input to the input interface 130 or the communicator 156.

When a signal of a power on button input to the input interface 130 is received, the controller 153 may control an operation of the tuner 151, the display 140, and the sound unit (not shown), when a signal of a channel button input to the input interface 130 is received, the controller 153 may control an operation of the tuner 131 and the display 140, and when a signal of a volume button input to the input interface 130 is received, the controller 153 may control an operation of the sound unit (not shown).

When a signal of a channel button input via a remote controller 160 is received, the controller 153 may control an operation of the tuner 151 and the display 140, and when a signal of a volume button input via the remote controller 160 is received, the controller 153 may control an operation of the sound unit (not shown).

When a broadcasting watching command input via the remote controller 160 is received, the controller 153 may control an operation of the tuner 151, the display 140, and the sound unit (not shown), and when a content play command is received, the controller 153 may control execution of content provided from a content providing server, content transmitted from the external device or content stored in the storage 154.

When displaying the image transmitted from at least one among the tuner 151, the interface 152, and the storage 154, the controller 153 may scale the plurality of areas configuring the image with the same ratio when a selection signal of the normal mode is received, and divide the image to be displayed into the plurality of areas when a selection signal of the three-dimensional mode is received, and adjust each of scaling ratios of the divided plurality of areas.

According to an exemplary embodiment, the plurality of areas may be areas in units of pixels, and each area may be one pixel for displaying the image.

The controller 153 may obtain the scaling ratios of the plurality of pixels based on a predetermined radius of curvature when displaying the image in the three-dimensional mode, and control so that the visible image having the predetermined radius of curvature is output by adjusting a scaling of the plurality of pixels based on the obtained scaling ratios.

When displaying the image in the three-dimensional mode, the controller 153 may confirm the radius of curvature selected by the user in a list having a plurality radii of curvatures, obtain the scaling ratios of the plurality of pixels based on the confirmed radius of curvature, and control so that the visible image having the selected radius of curvature is output by adjusting the scaling of the plurality of pixels based on the obtained scaling ratios.

Further, when displaying the three-dimensional mode, the controller 153 may confirm the radius of curvature input by the user, calculate the scaling ratios of the plurality of pixels based on the confirmed radius of curvature, and perform control so that the visible image having the input radius of curvature is output by adjusting the scaling of the plurality of pixels based on the calculated scaling ratios.

Figure 4:
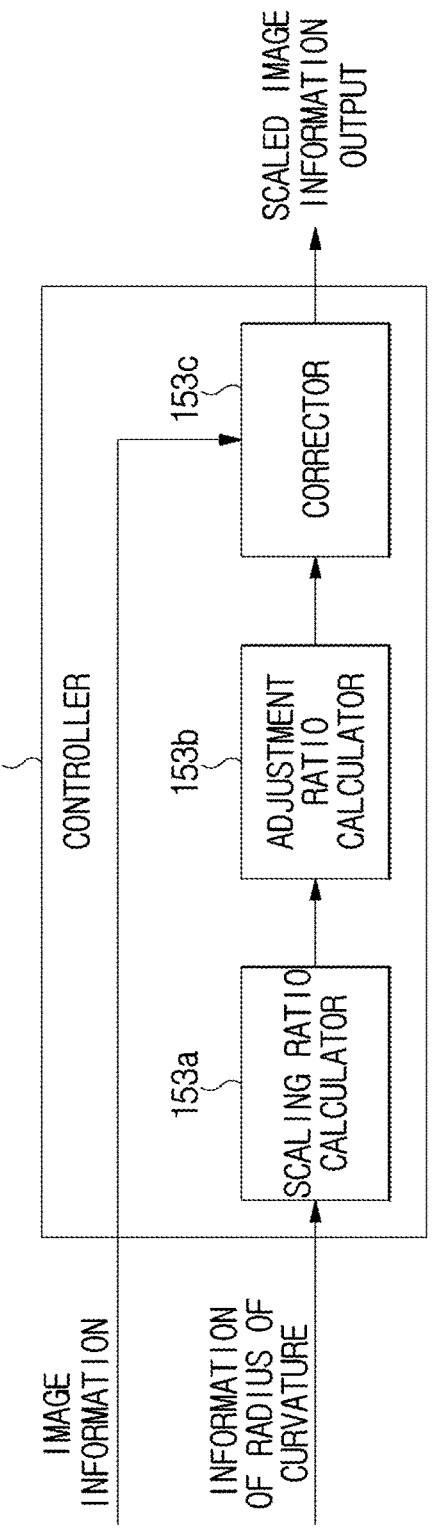
FIG. 4 is a diagram illustrating a controller of a display device according to an exemplary embodiment.

The controller 153 may include a scaling ratio calculator 153a, an adjustment ratio calculator 153b, and a corrector 153c, as shown in FIG. 4, according to an exemplary embodiment.

The scaling ratio calculator 153a may confirm a reference position spaced apart by a predetermined distance from the display 140, and calculate visible angles between lines obtained by connecting each of boundary points of the plurality of pixels configuring the plurality of pixels from the reference position.

The scaling ratio calculator 153a may obtain the visible image corresponding to the radius of curvature, calculate a reference angle between the lines obtained by connecting each of the boundary points of any one pixel of the visible image from the reference position, and calculate the scaling ratio of each of the plurality of pixels, based on the reference angle and the visible angle of each pixel.

According to an exemplary embodiment, the predetermined distance may be a radius corresponding to the radius of curvature, and the reference position may be a position spaced apart by the radius in a horizontal direction from a center position of the display.

The calculating of the scaling ratio for each of the plurality of pixels based on the reference angle and the visible angle for each pixel may include calculating the scaling ratio for each pixel based on a ratio of the reference angle and the visible angle for each pixel.

The adjustment ratio calculator 153b may calculate a first average ratio of the scaling ratios of the plurality of pixels configuring an original image, calculate a second average ratio of the scaling ratios of the plurality of pixels configuring the visible image, calculate a ratio difference by comparing the first average ratio and the second average ratio, and calculate an adjustment ratio by dividing the calculated ratio difference into a total number of pixels.

That is, loss of the scaled image may not be generated by adjusting the second average ratio so as to be equal to the first scaling ratio.

The corrector 153c may correct the calculated scaling ratios of the plurality of pixels based on the calculated scaling ratio for each pixel and the adjustment ratio, and output the corrected scaling ratios of the plurality of pixels.

That is, the corrector 153c may correct the scaling ratio for each pixel by applying the adjustment ratio for each pixel to the scaling ratio for each pixel, and scale each pixel according to the corrected scaling ratio.

Further, the total number of pixels may be the number of pixels arranged in a horizontal direction, and the pixels arranged in the same column may be adjusted according to the same scaling ratio.

The storage 154 may store a predetermined radius of curvature, and store the scaling ratio of each pixel corresponding to the predetermined radius of curvature.

The storage 154 may store the plurality radii of curvatures capable of being selected by the user in the list, and store the scaling ratio for each pixel corresponding to each radius of curvature.

The storage 154 may store a preview image corresponding to the radius of curvature in the list.

Accordingly, when the radius of curvature in the list is selected by the user, the display device may display the preview image that the user will view.

For example, when there are the radii of curvatures of 3000 R, 3500 R, 4000 R, 4200 R in the list, the display device may display the preview image corresponding to the radius of curvature of 4200 R when the radius of curvature of 4200 R is selected.

Here, the radius of curvature of 4200 R may mean a bending degree of a circle having a radius of 4200 mm.

Further, the storage 154 may store content having an image.

The driver 155 may drive the display 140 based on a command of the controller 153.

The communicator 156 may receive a button signal transmitted from the remote controller 160, and transmit the received button signal to the controller 153.

According to an exemplary embodiment, the button signal of the remote controller 160 may be a mode selection signal which is the normal mode or the three-dimensional mode, a selection signal of the radius of curvature, and the radius of curvature.

Figure 5:
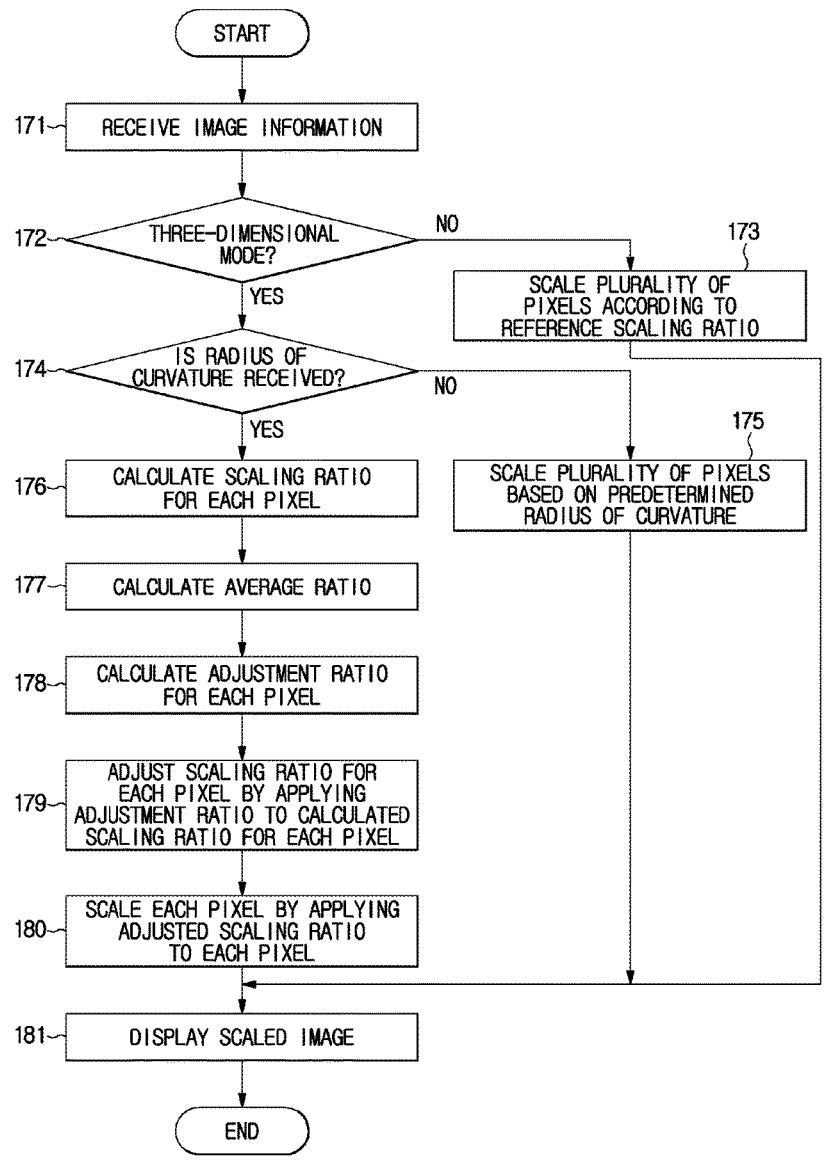
FIG. 5 is a flowchart illustrating a method of controlling a display device according to an exemplary embodiment.

FIG. 5 is a flowchart illustrating a method of controlling a display device according to an exemplary embodiment.

First, when the power on signal is input to the input interface 130 or the communicator 156, the display device may supply power for driving to each component and display a standby screen, and when the content play command is input by the user, display an image of input content.

Further, the display device may display a video signal as an image in the broadcasting signal of a channel which is selected before the power is turned on in a television.

That is, the display device may receive image information transmitted from the tuner, the interface, or the storage (in operation 171), and perform signal processing on the received image information.

In an exemplary embodiment, the signal processing may include separating the image signal and the sound signal, and converting an analog image signal into a digital image signal.

The display device may confirm a current display mode, determine whether the confirmed display mode is the three-dimensional mode (in operation 172), scale the plurality of pixels configuring the received image according to the predetermined reference scaling ratio when it is determined that the display mode is the normal mode (in operation 173), and display the scaled image (in operation 181).

Here, the predetermined reference scaling ratio may be 1.

The display device may display the image two-dimensionally by scaling the plurality of pixels configuring the image according to the same ratio when displaying the image in the normal mode.

On the other hand, the display device may determine whether the radius of curvature input by the user is received when it is determined that the confirmed display mode is the three-dimensional mode (in operation 174), and scale the image based on the predetermined radius of curvature when it is determined that the radius of curvature is not received (in operation 175).

That is, the display device may scale each of the plurality of pixels configuring the received image according to the scaling ratio corresponding to the predetermined radius of curvature.

According to an exemplary embodiment, the scaling ratio of each pixel corresponding to the predetermined radius of curvature may be previously stored.

That is, the display device may display the image to look three-dimensionally by scaling the plurality of pixels configuring the image as different ratios when displaying the image in the three-dimensional mode.

Next, the display device may obtain the visible image corresponding to the radius of curvature when the radius of curvature input by the user is received, and calculate the reference angle between lines obtained by connecting each of boundary points of any one pixel of the visible image from the reference position.

The display device may confirm the reference position spaced apart by a predetermined distance from the display 140, and calculate the visible angles between lines obtained by connecting each of boundary points of the plurality of pixels configuring the original image from the reference position.

According to an exemplary embodiment, the predetermined distance may be a radius corresponding to the radius of curvature, and the reference position may be a position spaced apart by the radius in a horizontal direction from the center position of the display.

The visible angle may be previously stored.

This will be described with reference to FIG. 6 according to an exemplary embodiment.

An example in which a first pixel P11, a second pixel P12, a third pixel P13, a fourth pixel P14, and a fifth pixel P15 among the plurality of pixels of the image displayed on the flat display panel are scaled will be described, according to an exemplary embodiment.

According to an exemplary embodiment, suppose that each pixel has a predetermined length d, and the radius corresponding to the radius of curvature is a predetermined radius R.

Further, suppose that a plurality of pixels of the visible image corresponding to the first pixel P11, the second pixel P12, the third pixel P13, the fourth pixel P14, and the fifth pixel P15 are a first pixel P21, a second pixel P22, a third pixel P23, a fourth pixel P24, and the fifth pixel P25.

The reference position O spaced apart by the predetermined distance from the center position of the display 140 may be obtained, and when connecting each of the boundary points between the plurality of pixels of the visible image from the reference position O by the lines, an angle between adjacent lines may be the same.

Figure 6:
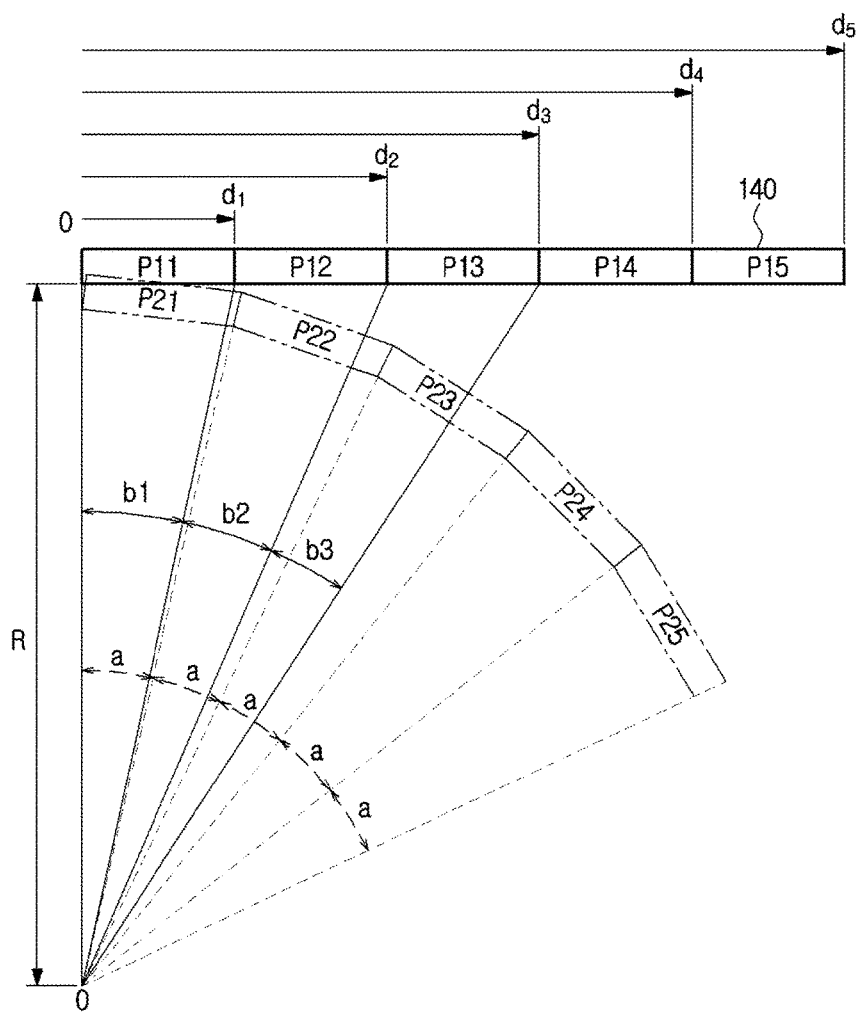
FIGS. 6 to 8 are diagrams illustrating adjustment of a scaling ratio of a display device according to an exemplary embodiment.

That is, an angle a between a line obtained by connecting the beginning point of one pixel and a line obtained by connecting the end point of the same pixel from the reference position O of the visible image may be the same, as shown in FIG. 6.

According to an exemplary embodiment, the angle a may be the reference angle.

The display device may calculate visible angles between the lines obtained by connecting each of boundary points of the plurality of pixels configuring the original image of the display 140 from the reference position O.

That is, a first visible angle b1 between a line obtained by connecting the beginning point of the first pixel and a line obtained by connecting the end point of the first pixel from the reference position O may be calculated, a second visible angle b2 between a line obtained by connecting the beginning point of the second pixel and a line obtained by connecting the end point of the second pixel from the reference position O may be calculated, and a third visible angle b3 between a line obtained by connecting the beginning point of the third pixel and a line obtained by connecting the end point of the third pixel from the reference position O may be calculated.

According to an exemplary embodiment, a method of calculating the reference angle and the visible angle will be described in more detail with reference to FIG. 6.

Reference angle $(a) = a\tan(d/R)$

First visible angle $(b1) = a\tan(d1/R) - a\tan(0/R)$

Second visible angle $(b2) = a\tan(d2/R) - a\tan(d1/R)$

Third visible angle $(b3) = a\tan(d3/R) - a\tan(d2/R)$

A fourth visible angle and a fifth visible angle may be calculated in this manner, according to an exemplary embodiment.

Next, the display device may calculate the scaling ratio of each pixel based on a ratio of the reference angle and the visible angle of each pixel (in operation 176).

Scaling ratio of the first pixel $= b1/a$

Scaling ratio of the second pixel $= b2/a$

Scaling ratio of the third pixel $= b3/a$

The scaling ratios of the fourth pixel and the fifth pixel may be calculated in this manner, according to an exemplary embodiment.

Next, the display device may calculate the first average ratio of the scaling ratios of the plurality of pixels configuring the original image, calculate the second average ratio of the scaling ratios of the plurality of pixels configuring the visible image (in operation 177), calculate the ratio difference by comparing the first average ratio and the second average ratio, and calculate the adjustment ratio for each pixel by dividing the calculated ratio difference into a total number of pixels (in operation 178).

That is, a loss of the scaled image may not be generated by adjusting the second average ratio so as to be equal to the first scaling ratio.

According to an exemplary embodiment, the first average ratio may be previously stored, and the adjustment ratio for each pixel may be the same.

Next, the display device may adjust the scaling ratios of the plurality of pixels based on the calculated scaling ratio and adjustment ratio for each pixel.

The display device may adjust the scaling ratio for each pixel by applying the adjustment ratio to the calculated scaling ratio for each pixel (in operation 179), and scale each pixel according to the adjusted scaling ratio (in operation 180).

This will be described with reference to FIGS. 7A, 7B, 7C and 7D, according to an exemplary embodiment.

Figure 7A:
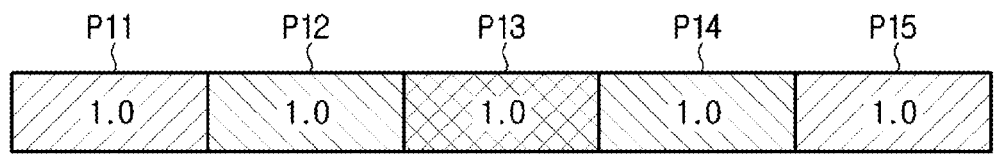

As shown in FIG. 7A, suppose that the scaling ratio of each of the pixels P11, P12, P13, P14 and P15 is 1, and the first average ratio is 1.

Figure 7B:
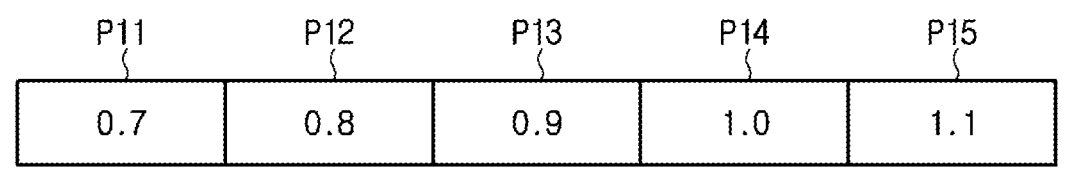

As shown in FIG. 7B, supposing that the scaling ratio of the first pixel P11 is 0.7, the scaling ratio of the second pixel P12 is 0.8, the scaling ratio of the third pixel P13 is 0.9, the scaling ratio of the fourth pixel P14 is 1.0, and the scaling ratio of the fifth pixel is 1.1, the second average ratio may be 0.9.

When comparing the first average ratio and the second average ratio, the ratio difference may be 0.1.

Accordingly, in an exemplary embodiment, the display device may reflect the unit ratio of 0.1 which is the adjustment ratio in each pixel.

Figure 7C:
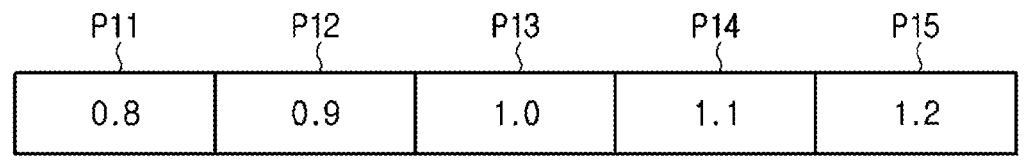

As shown in FIG. 7C, according to an exemplary embodiment, the first pixel P11 may be adjusted according to the scaling ratio of 0.8, the second pixel P12 may be adjusted according to the scaling ratio of 0.9, the third pixel P13 may be adjusted according to the scaling ratio of 1.0, the fourth pixel P14 may be adjusted according to the scaling ratio of 1.1, and the fifth pixel P15 may be adjusted according to the scaling ratio of 1.2.

Figure 7D:
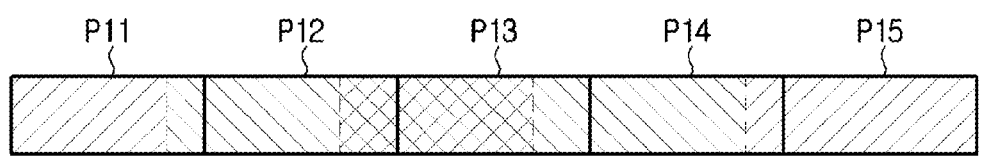

As shown in FIG. 7D, according to an exemplary embodiment, the second average ratio of the plurality of pixels in which the scaling ratio is adjusted may be 1, and thus loss of the image may be prevented since every image is arranged in the plurality of pixels.

Next, the display device may display the scaled image of each pixel (in operation 181).

Further, the number of the plurality of pixels may be the number of pixels arranged in a horizontal direction of the display, and the pixels arranged in the same column may be adjusted according to the same scaling ratio.

This will be described with reference to FIG. 8 according to an exemplary embodiment.

Figure 8:
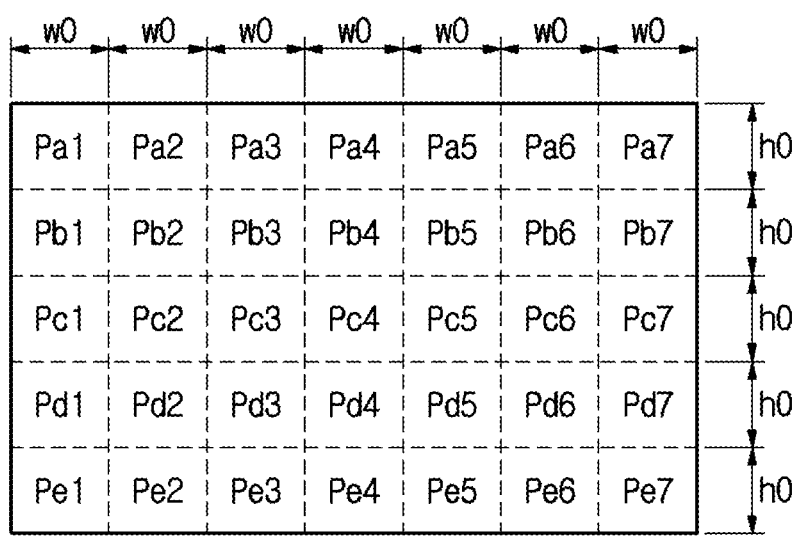

As shown in FIG. 8, the original image displayed on the display may include a plurality of pixels arranged in rows and columns.

According to an exemplary embodiment, the plurality of pixels may have the same width w0 and the same height h0, as shown in FIG. 8 by way of an example.

As shown in FIG. 8, the plurality of pixels of the scaled image may be adjusted according to the scaling ratios different from each other, and at this time, the pixels arranged in the same column may be adjusted according to the same scaling ratio.

That is, the display device may calculate the scaling ratios of pixels pa1, pa2, pa3, pa4, pa5, pa6, and pa7 arranged in a pa row, respectively, scale pixels pb1, pc1, pd1, and pe1 arranged in a column including the pixel pa1 according to the scaling ratio of the pixel pa1, scale pixels pb2, pc2, pd2 and pe2 arranged in a column including the pixel pa2 according to the scaling ratio of the pixel pa2, scale pixels pb3, pc3, pd3 and pe3 arranged in a column including the pixel pa3 according to the scaling ratio of the pixel pa3, and scale pixels pb4, pc4, pd4 and pe4 arranged in a column including the pixel pa4 according to the scaling ratio of the pixel pa4.

The fifth, sixth, and seventh column may be scaled in this manner, according to an exemplary embodiment.

Accordingly, as shown in FIG. 3, the flat display panel 140a of the display may display the visible image 141 having the radius of curvature in the three-dimensional mode.

According to an exemplary embodiment, the radius of curvature may mean a bending degree of a circle having a radius from the center position of the circle.

Through this, the display 140 may provide a visible effect like a curved display panel.

Figure 9:
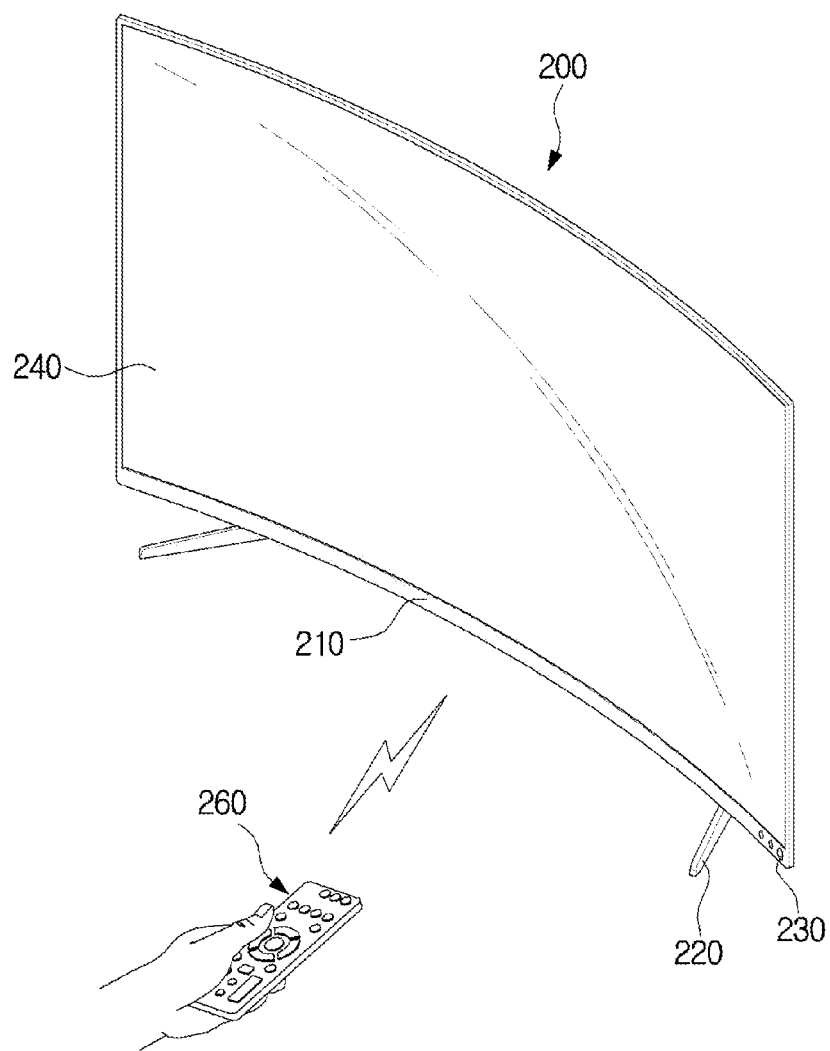
FIG. 9 is a diagram illustrating a display device according to another exemplary embodiment.

FIG. 9 is a diagram illustrating a display device according to yet another exemplary embodiment.

A display device 200 may include a body 210 providing a form of the display device 200 and covering an area in which an image is not displayed, and a stand 220 installed on the bottom of the body 210.

Here, the body 210 may include a cover covering a back surface of the area on which the image is displayed and a vessel covering edges of the area on which the image is displayed, and the cover and the vessel may be coupled to be detachable.

The display device 200 may be provided in the body 210, and include an input interface 230 for receiving input of an operation command from a user, and a display 240 installed inside the body 210, installed so that a display surface for displaying the image is exposed, and for displaying the image.

The input interface 230 may be arranged in or on the body 210, and include a plurality of buttons.

Here, the plurality of buttons may include a power button, a channel/volume button, a screen adjustment button, etc.

The display 240 may include any one among an LCD panel, an ELD panel, a FED panel, a PDP, a TFT-LCD panel, an OLED display panel, and any one display panel may be a curved display panel having a predetermined radius of curvature.

A sound output unit (not shown) for outputting a sound related to the image may be provided in the display device 200.

The display device 200 may perform remote communication with a remote controller 260, receive an operation signal manipulated by the remote controller 260, and perform an operation based on the received operation signal.

That is, the display device 200 may further include a driving module 250 for driving the display 240 in response to an operation command input to the input interface 230 and the remote controller 260. This will be described with reference to FIG. 10, according to an exemplary embodiment.

Figure 10:
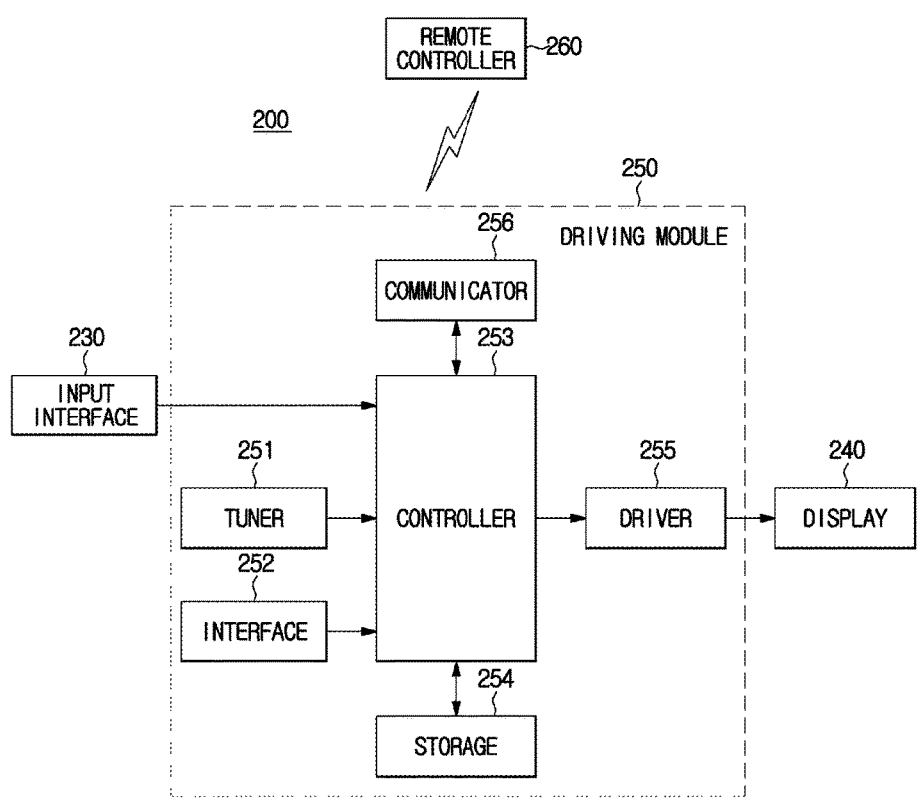
FIG. 10 is a diagram illustrating a control configuration of a display device according to another exemplary embodiment.

FIG. 10 is a diagram illustrating a control configuration of a display device according to yet another exemplary embodiment.

The input interface 230 may receive input of an operation command of a user, and transmit a signal corresponding to the operation command to a controller 253.

Further, the input interface 230 may select a normal mode for displaying an image having a predetermined radius of curvature and a three-dimensional mode for displaying an image having a radius of curvature selected by a user, and also select a two-dimensional mode of displaying a two-dimensional image.

The input interface 230 may receive input of a radius of curvature that the user wants from the user.

According to an exemplary embodiment, the input radius of curvature may be a radius of curvature different from the predetermined radius of curvature, and may be a radius of curvature input by the user when the user wants to see the image displayed on the display more three-dimensionally or two-dimensionally.

The display 240 may display a video signal included in a broadcasting signal as an image.

The display 240 may display an image stored in a storage 254 or an image of an external device connected to an interface 252.

The display 240 may display the image that appears to the user three-dimensionally by scaling the plurality of pixels with the scaling ratios different from each other and displaying the differently scaled plurality of pixels when displaying the image in the three-dimensional mode.

According to an exemplary embodiment, the image may include the plurality of pixels, and the plurality of pixels may have the same size.

Figure 11:
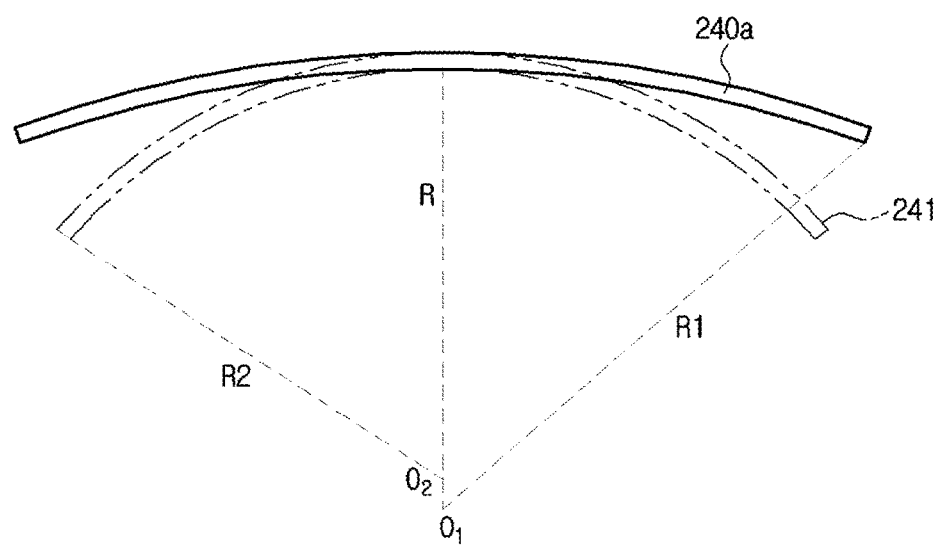
FIGS. 11 and 12 are diagrams illustrating an image and a visible image displayed on a display panel of a display device according to another exemplary embodiment.

As shown in FIG. 11, according to an exemplary embodiment, the display 240a may display a visible image 241 having a predetermined radius of curvature or a radius of curvature input by the user in the normal mode or the three-dimensional mode.

That is, the predetermined radius of curvature may be a radius of curvature which is different from the predetermined radius of curvature of the display panel, and the radius of curvature input by the user may be a radius of curvature which is different from the predetermined radius of curvature of the display panel and may be a radius of curvature of the visible image that the user wants to see.

According to an exemplary embodiment, the radius of curvature may mean a bending degree of a circle having a radius R from the center position O of the circle.

Through this, the display 240a may provide a visible effect of a curved display panel.

Figure 12:
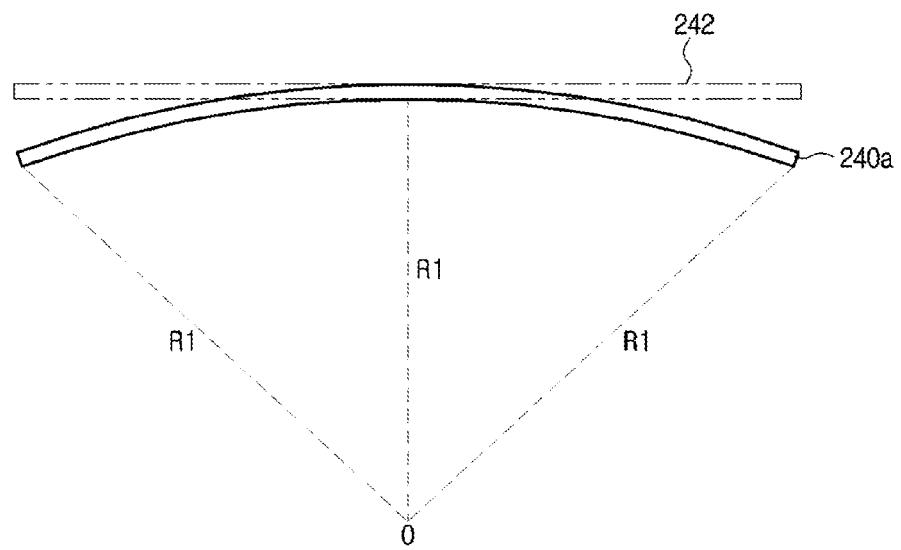

As shown in FIG. 12, according to an exemplary embodiment, the display 240a may display a two-dimensional visible image 242 in a two-dimensional mode.

Through this, the display 240a may provide a visible effect of the flat display panel.

The driving module 250 may include a tuner 251, an interface 252, a controller 253, a storage 254, a driver 255, and a communicator 256, according to an exemplary embodiment.

Since, according to an exemplary embodiment, the tuner 251, the interface 252, the driver 255, and the communicator 256 are analogous to the tuner 151, the interface 152, the driver 155, and the communicator 156 described above, respectively, detailed description thereof will be omitted.

When controlling display of an image transmitted from at least one among the tuner 251, the interface 252, and the storage 254, the controller 253 may scale a plurality of pixels configuring the image with the same scaling ratio when a selection signal of the normal mode is received, and scale the plurality of pixels with a predetermined scaling ratio when a selection signal of the two-dimensional mode is received. According to an exemplary embodiment, both modes display a two-dimensional image but are scaled differently.

The controller 253 may obtain scaling ratios of the plurality of pixels, respectively, based on the predetermined radius of curvature in the three-dimensional mode, and perform control so that the visible image having the predetermined radius of curvature is output by adjusting the scaling of the plurality of pixels based on the obtained scaling ratio.

When selecting the three-dimensional mode and the radius of curvature in the list, the controller 253 may confirm the selected radius of curvature, obtain the scaling ratios of the plurality of pixels based on the confirmed radius of curvature, and perform control so that the visible image having the selected radius of curvature is output by adjusting the scaling of the plurality of pixels based on the obtained scaling ratios.

Further, when selecting the three-dimensional mode and inputting the radius of curvature, the controller 253 may confirm the radius of curvature input by the user, calculate the scaling ratios of the plurality of pixels based on the confirmed radius of curvature, and perform control so that the visible image having input radius of curvature is output by adjusting the scales of the plurality of pixels based on the calculated scaling ratios.

Figure 13:
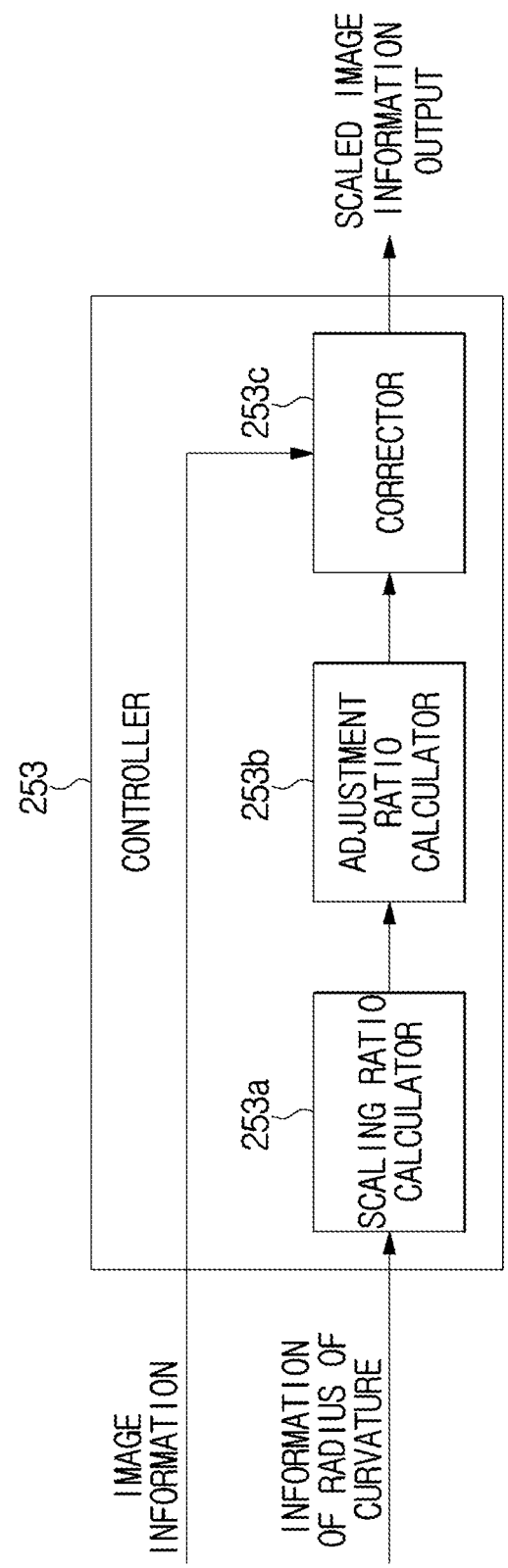
FIG. 13 is a diagram illustrating a controller of a display device according to another exemplary embodiment.

As shown in FIG. 13, the controller 253 may include a scaling ratio calculator 253a, an adjustment ratio calculator 253b, and a corrector 253c.

The scaling ratio calculator 253a may confirm a radius corresponding to the input radius of curvature, confirm a reference position corresponding to the confirmed radius, and calculate visible angles between lines obtained by connecting each of boundary points of the plurality of pixels of the curved display panel from the reference position.

The scaling ratio calculator 253a may obtain the visible image corresponding to the radius of curvature input by a user, calculate a reference angle between the lines obtained by connecting the boundary points of any one pixel of the visible image from the reference position, and calculate the scaling ratio of each of the plurality of pixels based on the reference angle and the visible angle of each pixel.

According to an exemplary embodiment, the reference position may be a position spaced apart by the radius in a horizontal direction from a center position of the display.

The calculating of the scaling ratio for each of the plurality of pixels based on the reference angle and the visible angle for each pixel may include calculating the scaling ratio for each pixel based on a ratio of the reference angle and the visible angle with respect to each pixel.

The adjustment ratio calculator 253b may calculate a first average ratio of the scaling ratios of the plurality of pixels configuring an image displayed on the curved display panel, calculate a second average ratio of the scaling ratios of the plurality of pixels configuring the visible image, calculate a ratio difference by comparing the first average ratio and the second average ratio, and calculate an adjustment ratio by dividing the calculated ratio difference into a total number of pixels.

That is, according to an exemplary embodiment, a loss of the scaled image may not be generated by adjusting the second average ratio so as to be equal to the first average ratio.

The corrector 253c may correct the calculated scaling ratios of the plurality of pixels based on the calculated scaling ratios and the adjustment ratios, respectively, and output the corrected scaling ratios of the plurality of pixels.

That is, the corrector 253c may correct the scaling ratio for each pixel by applying the adjustment ratio for each pixel to the scaling ratio for each pixel, and scale each pixel according to the corrected scaling ratio.

Further, the total number of pixels may be the number of pixels arranged in a horizontal direction, and the pixels arranged in the same column may be adjusted according to the same scaling ratio.

The storage 254 may store a predetermined radius of curvature for automatically performing the three-dimensional mode, and store the scaling ratio of each pixel corresponding to the predetermined radius of curvature, according to an exemplary embodiment.

The storage 254 may store the plurality radii of curvatures capable of being selected by the user in the list in the three-dimensional mode, and store the scaling ratio of each pixel corresponding to each radius of curvature, according to an exemplary embodiment.

The storage 254 may store a preview image corresponding to the radius of curvature in the list.

Accordingly, when the radius of curvature in the list is selected by the user, the display device may display the preview image that the user will see or view.

For example, when the radii of curvatures of 3000 R, 3500 R, 4000 R, 4200 R are stored in the list in a state in which the predetermined radius of curvature of the display device is 4200 R, the display device may display the preview image corresponding to the radius of curvature of 3000 R when the radius of curvature of 3000 R is selected.

According to an exemplary embodiment, the radius of curvature of 4200 R may mean a bending degree of a circle having a radius of 4200 mm.

Further, the storage 254 may store the scaling ratios applied to the plurality of pixels in the two-dimensional mode, according to an exemplary embodiment.

According to an exemplary embodiment, the button signal of the remote controller 260 may be a mode selection signal of the two-dimensional mode, the normal mode, or the three-dimensional mode, a selection signal of the radius of curvature, and a radius of curvature.

Figure 14:
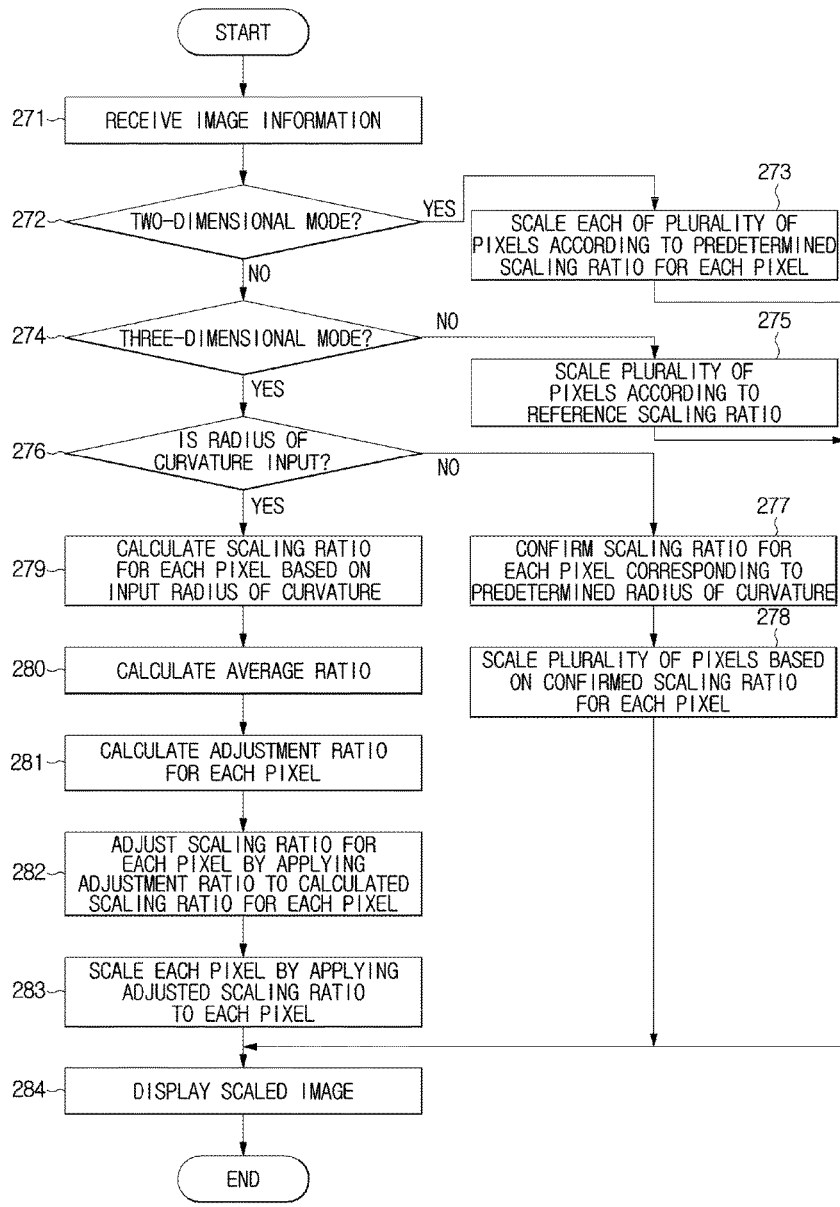
FIG. 14 is a flowchart illustrating a method of controlling a display device according to another exemplary embodiment.

FIG. 14 is a flowchart for describing a method of controlling a display device according to another exemplary embodiment. The method will be described with reference to FIG. 15.

First, when the power on signal is input to the input interface 230 or the communicator 256, the display may supply power for driving each component and display a standby screen, and when the content play command is input by the user, display an image of the input content.

Further, the display may display a video signal in a broadcasting signal of a channel which is selected as an image before the power is turned on in a television.

That is, the display device may receive image information transmitted from the tuner, the interface, or the storage (in operation 271), and perform signal processing on the received image information.

According to an exemplary embodiment, the signal processing may include separating the image signal and the sound signal, and converting an analog image signal into a digital image signal.

The display device may confirm a current display mode, determine whether the confirmed display mode is the two-dimensional mode (in operation 272), scale the plurality of pixels configuring the received image according to the predetermined scaling ratio of each pixel when it is determined that the display mode is the two-dimensional mode (in operation 273), and display the scaled image (in operation 284).

According to an exemplary embodiment, the predetermined scaling ratio of each pixel may be pre-stored.

On the other hand, according to an exemplary embodiment, the display device may determine whether the display mode is the three-dimensional mode when it is determined that the confirmed display mode is not the two-dimensional mode (in operation 274), and at this time, when it is determined that the display mode is not the three-dimensional mode, recognize the display mode as the normal mode, and scale the plurality of pixels according to the predetermined reference scaling ratios, respectively (in operation 275).

According to an exemplary embodiment, the predetermined reference scaling ratio may be 1.

The display device may display the image on the curved display panel after scaling the plurality of pixels configuring the image with the same scaling ratio when displaying the image in the normal mode.

That is, the image in which the plurality of pixels are scaled according to the same scaling ratio may be output, but images having various curvatures according to a shape of the display may be output.

The display device may determine whether the input radius of curvature input by the user is received when it is determined that the display mode is the three-dimensional mode, (in operation 275), confirm the scaling ratio of each pixel corresponding to the predetermined radius of curvature when the radius of curvature is not received (in operation 277), and scale each of the plurality of pixels based on the confirmed scaling ratio of each pixel (in operation 278).

According to an exemplary embodiment, the three-dimensional mode may be a display mode of displaying the image displayed on the curved display panel according to a radius of curvature different from the predetermined radius of curvature of the curved display panel, and the predetermined radius of curvature may be information stored when manufacturing the display device.

The scaling ratio of each pixel corresponding to the predetermined radius of curvature may be pre-stored.

That is, the display device may display the image to appear three-dimensionally by scaling the plurality of pixels according to ratios different from each other when displaying the image in the three-dimensional mode.

On the other hand, the display device may obtain the visible image corresponding to the input radius of curvature when it is determined that the radius of curvature is input by the user in a state that the confirmed display mode is the three-dimensional mode, and calculate the reference angle between lines obtained by connecting each of boundary points of any one pixel of the visible image from the reference position.

The display device may confirm the reference position spaced apart by a predetermined distance from the display 240, and calculate the visible angles between lines obtained by connecting each of boundary points of the plurality of pixels configuring the image displayed on the display from the reference position.

According to an exemplary embodiment, the predetermined distance may be a radius corresponding to the radius of curvature, and the reference position may be a position spaced apart by the radius in a horizontal direction from the center position of the display.

The visible angle may be pre-stored according to an exemplary embodiment.

Figure 15:
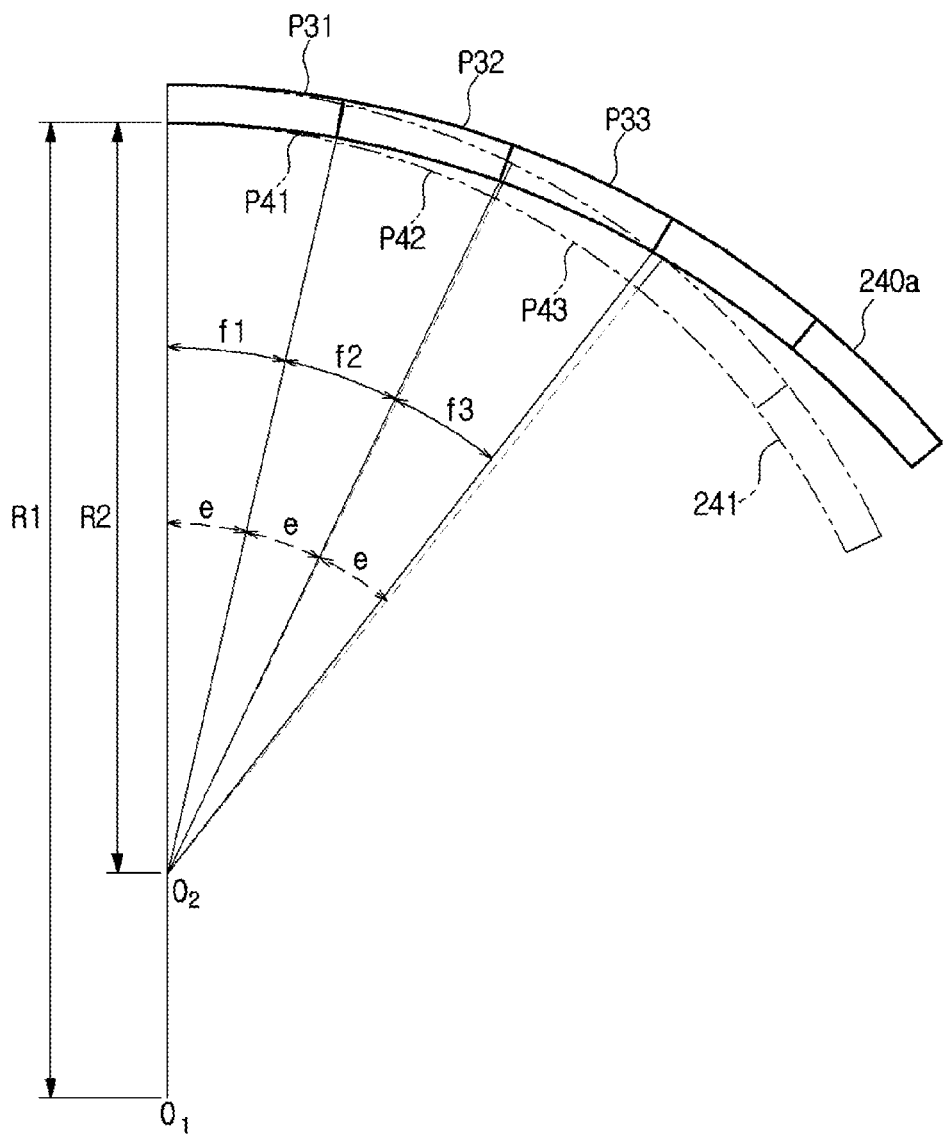
FIG. 15 is a diagram illustrating adjustment of a scaling ratio of a display device according to another exemplary embodiment.

This will be described with reference to FIG. 15 according to an exemplary embodiment.

An example in which a first pixel P31, a second pixel P32, and a third pixel P33 among the plurality of pixels of the image displayed on the curved display panel 240a are scaled will be described.

According to an exemplary embodiment, suppose that the curved display panel 240a may have a radius R1 corresponding to the predetermined radius of curvature, and have a center position O1.

Further, the visible image 241 having the radius of curvature input by the user may have a radius R2 corresponding to the input radius of curvature, and have a center position O2.

Moreover, suppose that a first pixel P41, a second pixel P42, and a third pixel P43 of the visible image correspond to the first pixel P31, the second pixel P32, and the third pixel P33 of the image displayed on the display panel 240a.

The reference position O2 spaced apart by the predetermined distance from the center position of the curved display panel 240a may be obtained, and when connecting each of the boundary points between the plurality of pixels of the visible image 241 from the reference position O2 by the lines, angles between adjacent lines may be the same.

That is, an angle e between a line obtained by connecting the beginning point of one pixel and a line obtained by connecting the end point of the same pixel from the reference position O2 of the visible image may be the same as that obtained with respect to another pixel.

According to an exemplary embodiment, the angle e may be the reference angle.

The display device may calculate visible angles between the lines obtained by connecting each of boundary points of the plurality of pixels configuring the image of the curved display panel 240a from the reference position O2.

That is, a first visible angle f1 between a line obtained by connecting the beginning point of the first pixel P31 and a line obtained by connecting the end point of the first pixel P31 from the reference position O2 may be calculated, a second visible angle f2 between a line obtained by connecting the beginning point of the second pixel P32 and a line obtained by connecting the end point of the second pixel P32 from the reference position O2 may be calculated, and a third visible angle f3 between a line connecting the beginning point of the third pixel P33 and a line obtained by connecting the end point of the third pixel P33 from the reference position O2 may be calculated.

According to an exemplary embodiment, a method of calculating the reference angle and the visible angle will be described in more detail.

Reference angle $(e) = \arc\tan(g/R2)$

First visible angle $(f1) = \arc\tan(h1/R2) - \arc\tan(0/R2)$

Second visible angle $(f2) = \arc\tan(h2/R2) - \arc\tan(h1/R2)$

Third visible angle $(f3) = \arc\tan(h3/R2) - \arc\tan(h2/R2)$

Here, g may be a length of a line obtained by connecting both end points of the pixel of the visible image.

And, h1 may be a length of a line obtained by connecting the beginning point and the end point of the first pixel of the image displayed on the curved display panel.

Further, h2 may be a length of a line obtained by connecting the beginning point of the first pixel and the end point of the second pixel of the image displayed on the curved display panel.

Moreover, h3 may be a length of a line generated by connecting the beginning point of the first pixel and the end point of the third pixel of the image displayed on the curved display panel.

Next, the display device may calculate the scaling ratio of each pixel based on a ratio of the reference angle and the visible angle of each pixel (in operation 279).

Scaling ratio of the first pixel $(P31) = f1/e$

Scaling ratio of the second pixel $(P32) = f2/e$

Scaling ratio of the third pixel $(P33) = f3/e$

Next, the display device may calculate the first average ratio of the scaling ratios of the plurality of pixels configuring the image displayed on the curved display panel, calculate the second average ratio of the scaling ratios of the plurality of pixels configuring the visible image (in operation 280), calculate the ratio difference by comparing the first average ratio and the second average ratio, and calculate an adjustment ratio of each pixel by dividing the calculated ratio difference into a total number of pixels (in operation 281).

That is, loss of the scaled image may not be generated by adjusting the second average ratio so as to be equal to the first average ratio.

According to an exemplary embodiment, the first average ratio may be previously stored, and the adjustment ratio for each pixel may be the same.

Next, the display device may correct the scaling ratio for each of the plurality of pixels based on the calculated scaling ratio and adjustment ratio for each pixel.

Next, the display device may correct the scaling ratio for each pixel by applying the adjustment ratio to the calculated scaling ratio for each pixel (in operation 282), and scale each pixel according to the corrected scaling ratio (in operation 283).

Next, the display device may display the scaled image for each pixel (in operation 284).

Further, the number of the plurality of pixels may be the number of pixels arranged in a horizontal direction of the display, and the pixels arranged in the same column may be adjusted according to the same scaling ratio.

Through this, the display 240 may display the image having a radius of curvature different from the predetermined radius of curvature of the curved display panel.

Figure 16:
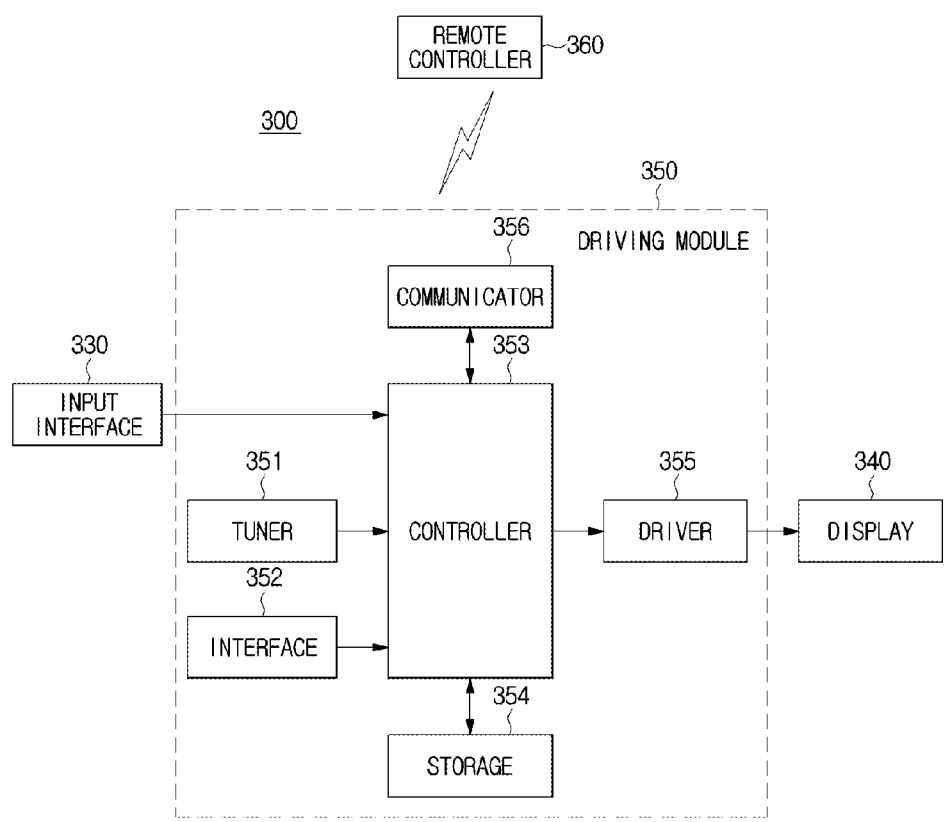
FIG. 16 is a diagram illustrating a control configuration of a display device according to yet another exemplary embodiment.

FIG. 16 is a diagram illustrating a display device according to yet another exemplary embodiment.

A display device 300 according to yet another exemplary embodiment may include a flat display panel or a curved display panel.

The input interface 330 may receive input of an operation command of a user, and transmit a signal corresponding to the operation command to a controller 353.

Further, the input interface 330 may receive a normal mode of displaying an image having a radius of curvature of the display panel and a three-dimensional mode of displaying a three-dimensional image.

According to an exemplary embodiment, the normal mode may be a mode of displaying an image having the radius of curvature equal to that of the display panel by scaling a plurality of pixels configuring the image according to the same ratio, and the three-dimensional mode may be a mode of displaying an image having a radius of curvature different from that of the display panel by scaling the plurality of pixels configuring the image according to different ratios.

The input interface 330 may receive a radius of curvature that the user wants from the user.

According to an exemplary embodiment, the radius of curvature may be information for setting a curvature of a curved image when the visible image that the user sees is not a planar image but a curved image.

The display 340 may display a video signal included in a broadcasting signal as an image, and display the image stored in the storage 354 or the image of an external device connected to the interface 352.

The display 340 may display the image to appear three-dimensionally by scaling and displaying the plurality of pixels with the different ratio when displaying the image in the three-dimensional mode.

According to an exemplary embodiment, the image may include a plurality of pixels, and the plurality of pixels may have the same size.

The driving module 350 may include a tuner 351, an interface 352, a controller 353, a storage 354, a driver 355, and a communicator 356.

Since the tuner 351, the interface 352, the driver 355, and the communicator 356 according to yet another exemplary embodiment are analogous to the tuner 151, the interface 152, the driver 155, and the communicator 156 according to an exemplary embodiment described above, respectively, detailed description thereof will be omitted.

The controller 353 may control output of the image and the sound based on an operation signal of the remote controller input to the input interface 330 or the communicator 356.

When controlling a display of an image transmitted from at least one among the tuner 351, the interface 352, and the storage 354, the controller 353 may scale a plurality of pixels configuring the image according to the same scaling ratio when a selection signal of a normal mode is received, and divide the image to be displayed into a plurality of areas and adjust the scaling ratios of the plurality of areas according to different ratios, respectively, when a selection signal of the three-dimensional mode is received.

According to an exemplary embodiment, the plurality of areas may be areas in units of pixels, and each area may be one pixel for displaying the image.

The controller 353 may obtain scaling ratios of the plurality of pixels based on the predetermined radius of curvature when displaying the image in the three-dimensional mode, and perform control so that the visible image having the predetermined radius of curvature is output by adjusting the scaling of the plurality of pixels based on the obtained scaling ratios.

When displaying the image in the three-dimensional mode, the controller 353 may confirm the radius of curvature selected by the user in the list in which the plurality radii of curvatures are included, obtain the scaling ratios of the plurality of pixels based on the confirmed radius of curvature, and perform control so that the visible image having the selected radius of curvature is output by adjusting the scaling of the plurality of pixels based on the obtained scaling ratios.

Further, when displaying the image in the three-dimensional mode, the controller 353 may confirm the radius of curvature input by the user, calculate the scaling ratios of the plurality of pixels based on the confirmed radius of curvature, and perform control so that the visible image having the input radius of curvature is output by adjusting the scaling of the plurality of pixels based on the calculated scaling ratios.

The controller 353 may maximize perspective of the image by readjusting the scaling ratio of each pixel based on the brightness of each pixel in the three-dimensional mode.

Figure 17:
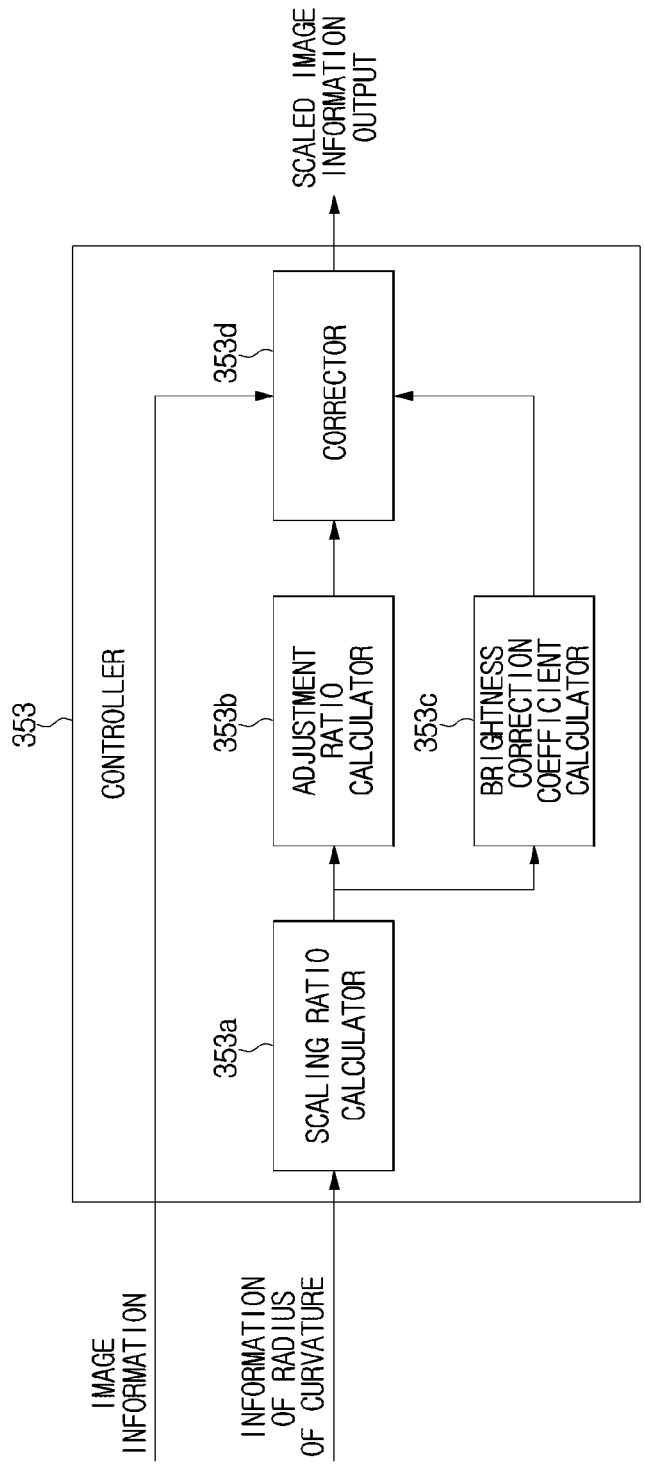
FIG. 17 is a diagram illustrating a controller of a display device according to yet another exemplary embodiment.

As shown in FIG. 17, the controller 353 may include a scaling ratio calculator 353a, an adjustment ratio calculator 353b, a brightness correction coefficient calculator 353c, and a corrector 353d.

The scaling ratio calculator 353a may confirm a reference location spaced apart by a predetermined distance from the display panel, and calculate visible angles between lines obtained by connecting each of boundary points of the plurality of pixels configuring the image displayed on the display panel from the reference position.

The scaling ratio calculator 353a may obtain the visible image corresponding to the input radius of curvature, calculate the reference angle between the lines generated by connecting each of boundary points of any one pixel of the visible image from the reference position, and calculate the scaling ratio of each of the plurality of pixels based on the reference angle and the visible angle of each pixel.

According to an exemplary embodiment, the predetermined distance may be a distance corresponding to the radius of curvature, and the reference position may be a position spaced apart by the radius in a horizontal direction from a center position of the display panel.

The calculating of the scaling ratio of each of the plurality of pixels based on the reference angle and the visible angle of each pixel may include calculating the scaling ratio of each pixel based on a ratio of the reference angle and the visible angle with respect to each pixel.

The adjustment ratio calculator 353b may calculate a first average ratio of the scaling ratios of the plurality of pixels configuring the image displayed on the display panel, calculate a second average ratio of the scaling ratios of the plurality of pixels configuring the visible image, calculate a ratio difference by comparing the first average ratio and the second average ratio, and calculate an adjustment ratio by dividing the calculated ratio difference into a total number of pixels.

That is, a loss of the scaled image may not be generated by adjusting the second average ratio so as to be equal to the first average ratio.

The brightness correction coefficient calculator 353c may calculate a brightness correction coefficient for each pixel based on the scaling ratio for each pixel calculated in the scaling ratio calculator 353a.

Brightness correction coefficient=first correction value×(scaling ratio+second correction value).

According to an exemplary embodiment, the first correction value may be a value for correcting the scaling ratio, the second correction value may be a value for correcting offset of the brightness, and the first correction value and the second correction value may be pre-stored.

The brightness correction coefficient calculator 353c may correct the brightness for each pixel based on a first ratio for increasing the brightness and a second ratio for decreasing the brightness.

For example, the brightness correction coefficient calculator 353c may output a brightness correction coefficient for each pixel, compare the calculated scaling ratio for each pixel and the first ratio, output a first brightness correction coefficient when the calculated scaling ratio is more than the first ratio, compare the calculated scaling ratio for each pixel and second ratio, and output a second brightness correction coefficient when the calculated scaling ratio is less than the second ratio.

Further, the brightness correction coefficient calculator 353c may compare the calculated scaling ratio for each pixel and the first ratio, output a brightness correction coefficient corresponding to a ratio difference when the calculated scaling ratio is more than the first ratio, compare the calculated scaling ratio for each pixel and the second ratio, and output the brightness correction coefficient corresponding to the ratio difference when the calculated scaling ratio is less than the second ratio.

According to an exemplary embodiment, the brightness correction coefficient corresponding to the ratio difference may be pre-stored.

The corrector 353d may correct the scaling ratios of the plurality of pixels based on the calculated scaling ratio for each pixel and the adjustment ratio, apply the brightness correction coefficient to the corrected plurality of pixels, and output the image in which the scaling ratios and the brightness are corrected after correcting the brightness of the plurality of pixels.

That is, the corrector 153c may correct the scaling ratio of each pixel by applying the adjustment ratio for each pixel to the scaling ratio for each pixel, and correct the brightness for each pixel by applying the brightness correction coefficient for each pixel to each of the plurality of the pixels after scaling each pixel according to the corrected scaling ratio.

The storage 354 may store a predetermined radius of curvature, and store the scaling ratio for each pixel corresponding to the predetermined radius of curvature.

The storage 354 may store the plurality radii of curvatures configured to be selected by the user from the list, and store the scaling ratio for each pixel corresponding to each radius of curvature, according to an exemplary embodiment.

The storage 354 may store a preview image corresponding to the radius of curvature provided in the list.

Further, the storage 354 may store content, etc. having the image.

The storage 354 may store a first correction value and a second correction value for correcting the brightness, according to an exemplary embodiment.

Further, the storage 354 may store the first ratio and the second ratio for correcting the brightness, and store the brightness correction coefficient corresponding to the ratio difference.

Figure 18:
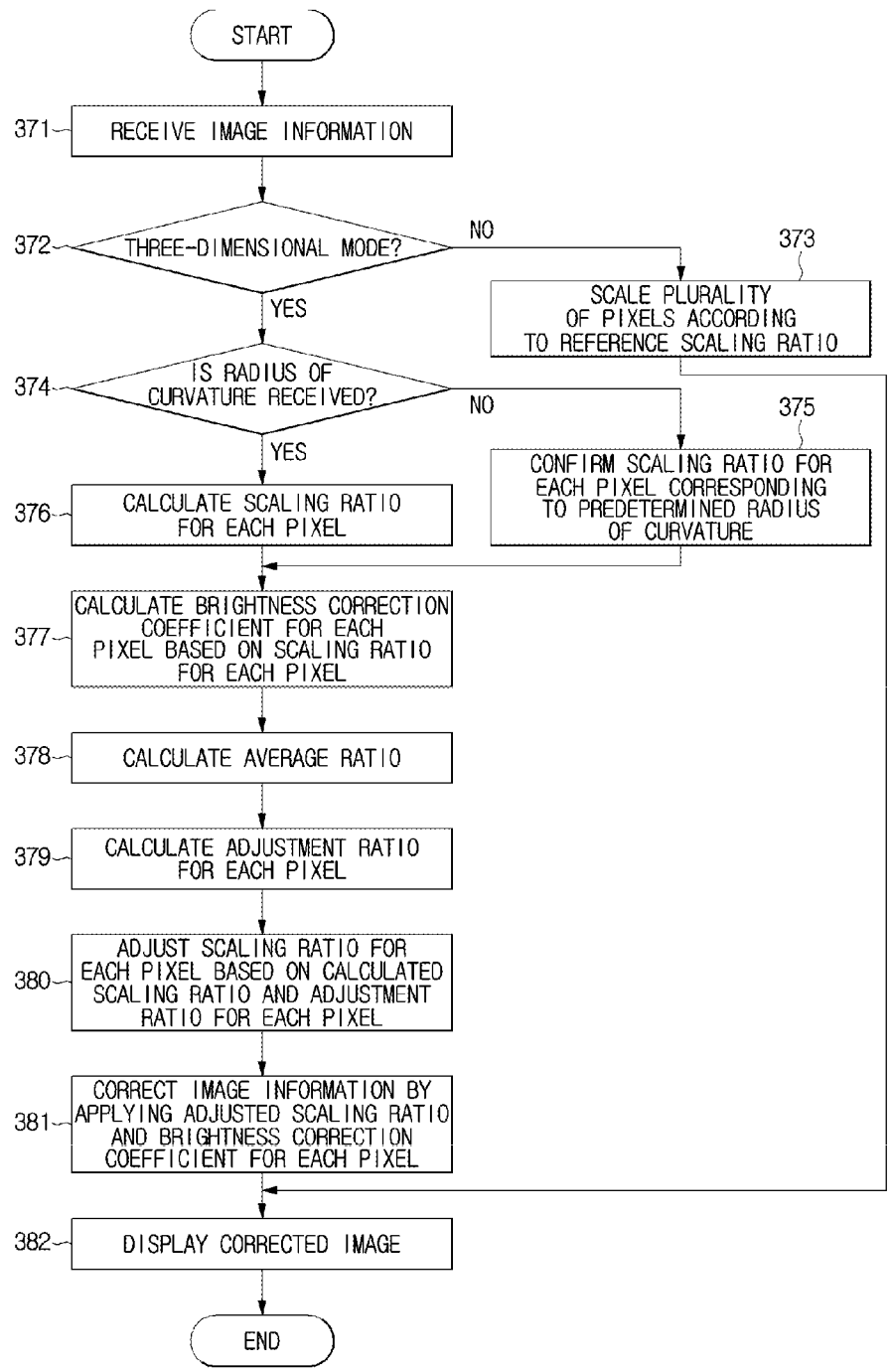
FIG. 18 is a flowchart illustrating a method of controlling a display device according to yet another exemplary embodiment.

FIG. 18 is a flowchart illustrating a method of controlling a display device according to yet another exemplary embodiment.

According to an exemplary embodiment, when the power on signal is input to the input interface 330 or the communicator 356, the display may supply power for driving each component and display a standby screen, and when the content play command is input by the user, display an image of input content.

Further, the display may display a video signal in a broadcasting signal of a channel which is selected as an image before the power is turned on in a television, according to an exemplary embodiment.

That is, the display device may receive image information transmitted from the tuner, the interface, or the storage (in operation 371), and perform signal processing on the received image information.

The display device may confirm a current display mode, determine whether the confirmed display mode is the three-dimensional mode (in operation 372), and scale the plurality of pixels configuring the received image according to the predetermined reference scaling ratio when it is determined that the display mode is the normal mode e.g., the two-dimensional mode (in operation 373).

According to an exemplary embodiment, the predetermined reference scaling ratio may be 1.

The display device may display the image to appear two-dimensionally by scaling the plurality of pixels configuring the image with the same ratio when displaying the image in the normal mode on the flat display panel.

The display device may display the image having the predetermined radius of curvature of the curved display panel by scaling the plurality of pixels configuring the image according to the same ratio when displaying the image in the normal mode on the curved display panel.

On the other hand, according to an exemplary embodiment, the display device may determine whether the radius of curvature is input by the user when it is determined that the confirmed display mode is the three-dimensional mode (in operation 374), confirm the predetermined radius of curvature when it is determined that the radius of curvature is not input, and confirm the scaling ratio of each pixel corresponding to the confirmed predetermined radius of curvature (in operation 375).

According to an exemplary embodiment, the scaling ratio of each pixel corresponding to the predetermined radius of curvature may be pre-stored.

Next, according to an exemplary embodiment, the display device may obtain the visible image corresponding to the input radius of curvature when it is determined that the radius of curvature is input by the user, and calculate a reference angle between lines obtained by connecting each of boundary points of any one pixel of the visible image from the reference position.

The display device may confirm the reference position spaced apart by a predetermined distance from the display 340, and calculate the visible angles between lines obtained by connecting each of boundary points of the plurality of pixels configuring the original image from the reference position.

According to an exemplary embodiment, the predetermined distance may be a radius corresponding to the radius of curvature, and the reference position may be a position spaced apart by the radius in a horizontal direction from the center position of the display panel.

The visible angle may be pre-stored.

Next, the display device may calculate the scaling ratio of each pixel based on the reference angle and the visible angle of each pixel (in operation 376).

According to an exemplary embodiment, since the calculating of the scaling ratio for each pixel in the display device having the flat display panel is analogous to an exemplary embodiment described above and the calculating of the scaling ratio for each pixel in the display device having the curved display panel is analogous to another exemplary embodiment described above, detailed description thereof will be omitted.

Next, the display device may calculate the brightness correction coefficient of each pixel based on the calculated scaling ratio of each pixel (in operation 377).

Next, the display device may calculate a first average ratio of the scaling ratios of the plurality of pixels configuring the image displayed on the display panel, calculate a second average ratio of the scaling ratios of the plurality of pixels configuring the visible image (in operation 378), calculate the ratio difference by comparing the first average ratio and the second average ratio, and calculate an adjustment ratio of each pixel by dividing the calculated ratio difference into a total number of pixels (in operation 379).

That is, a loss of the scaled image may not be generated by adjusting the second average ratio so as to be equal to the first average ratio.

According to an exemplary embodiment, the first average ration may be pre-stored, and the adjustment ratio of each pixel may be the same.

Next, the display device may correct the scaling ratios of the plurality of pixels based on the calculated scaling ratio and the adjustment ratio with respect to each pixel (in operation 380).

That is, the display device may correct the scaling ratio for each pixel by applying the adjustment ratio to the calculated scaling ratio for each pixel.

Next, the display device may correct the brightness for each pixel by applying the brightness correction coefficient in which the scaling ratio is corrected for each pixel (in operation 381).

That is, the display device may output the corrected image information (in operation 382) after correcting the image information to be output by applying the scaling ratio and the brightness correction coefficient to each pixel (in operation 381).

When the display panel is the flat display panel, the correction of the scaling ratio and the brightness will be described with reference to FIGS. 19 and 20, according to an exemplary embodiment.

Figure 19:
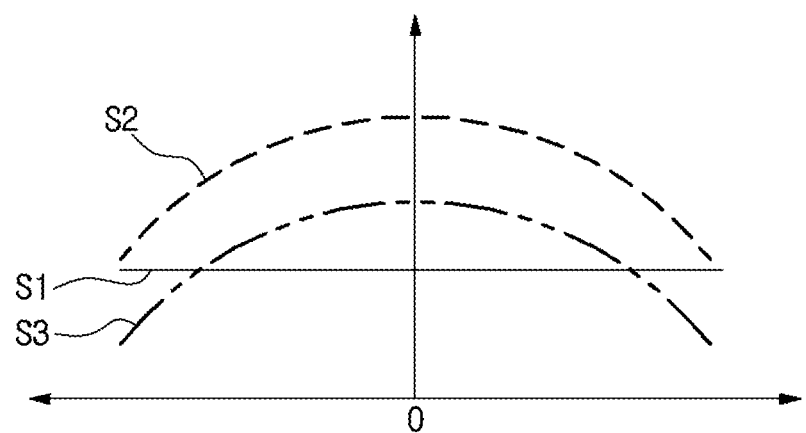
FIGS. 19 and 20 are diagrams illustrating image display of a display device according to yet another exemplary embodiment.

As shown in FIG. 19, when scaling each pixel according to the predetermined reference scaling ratio, the image of a plane S1 may be displayed when the user looks at or views the display device from the center position, when scaling each pixel according to the calculated scaling ratio, the image having a radius of curvature S2 may be displayed when the user looks at or views the display device from the center position, and when scaling each pixel according to the calculated scaling ratio and adjustment ratio, the image having a radius of curvature S3 may be displayed when the user looks at or view the display device from the center position.

That is, the image in which a three-dimensional effect is improved may be displayed by scaling each pixel according to the calculated scaling ratio and adjustment ratio, in an exemplary embodiment.

Figure 20:
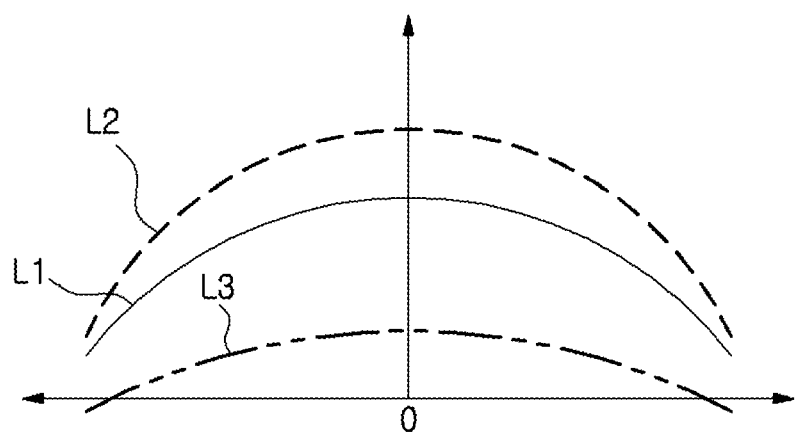

As shown in FIG. 20, when the brightness of each pixel, in which the scaling ratio is corrected, is also corrected based on the brightness correction coefficient, the image L2 which appears more distant than the image L1 before the brightness is corrected may be displayed, or the image L3 which appears to be closer than the image L1 before the brightness is corrected may be displayed, according to an exemplary embodiment.

That is, the perspective of the image may be improved by correcting the brightness of each pixel, according to an exemplary embodiment.

The display device may display the visible image having a radius of curvature different from that of the display panel in the three-dimensional mode, and display the visible image in which the perspective is improved according to the brightness correction, according to an exemplary embodiment.

An exemplary embodiment can enlarge the image to a maximum area provided in the display device by applying the same viewing distance calculation method used in the curved display device with respect to the scaling of the image.

Accordingly, the discontinuity of the image can be removed by providing a continuous scaling, and the perspective, presence, viewing experience can be enhanced while adaptively correcting the brightness according to the scaling ratio of the image, according to various exemplary embodiments.

The display device can display the image having the curvature that the user wants, and thus display similar to the curved display device.

Further, optical illusion of watching the three-dimensional image can be generated, according to an exemplary embodiment.

Although a few exemplary embodiments have been shown and described, it would be appreciated by those skilled in the art that changes may be made in these exemplary embodiments without departing from the principles and spirit of an inventive concept, the scope of which is defined in the claims and their equivalents. The foregoing exemplary embodiments are merely exemplary and are not to be construed as limiting. The description of exemplary embodiments is intended to be illustrative, and not to limit the scope of the claims, and many alternatives, modifications, and variations will be apparent to those skilled in the art.

What is claimed is:

1. A display device, comprising:
 a display;
 an input interface configured to receive an operation command of selecting one of a two-dimensional mode and a three-dimensional mode;
 a storage configured to store a scaling ratio of each pixel corresponding to the three-dimensional mode; and
 a controller configured to:
  receive an image, and perform image processing of the received image based on the scaling ratio of each pixel stored by the storage so a radius of curvature of a visible image and a radius of curvature of the image to be displayed on the display are different,
 wherein the stored scaling ratio is a ratio obtained by a reference angle and a visible angle,
 wherein the visible angle includes an angle between lines obtained by connecting each of boundary points of each pixel of the display panel from a reference position,
 wherein the reference angles include an angle between lines obtained by connecting each of boundary points of any one pixel of the visible image from the reference position, and
 wherein the reference position is a position spaced apart by a radius corresponding to the input radius of curvature in a horizontal direction from the center position of the display.

2. The display device of claim 1, wherein in response to receiving the operation command of selecting the three-dimensional mode, the controller is further configured to correct brightness of the image to be displayed based on the stored scaling ratio of the image to be displayed.

3. The display device of claim 2, wherein the controller is configured to brighten a pixel in response to the stored scaling ratio being larger than a first ratio, and darken the pixel in response to the stored scaling ratio being smaller than a second ratio.

4. The display device of claim 1, wherein the display comprises one of a flat display panel and a curved display panel.

5. A display device, comprising:
 a display configured to display an image;

an input interface configured to: receive an operation command of selecting one of a two-dimensional mode and a three-dimensional mode, and in response to receiving the operation command of selecting the three dimensional mode, receive a user input of a radius of curvature of a visible image shown to the user; and a controller configured to: receive an image, obtain a visible angle based on a plurality pixels of a received image, obtain a reference angle based on the user input of the radius of curvature, obtain a scaling ratio of each of the plurality pixels of the received image based on the reference angle and the visible angle, and perform image processing on the image based on the obtained scaling ratio, wherein the visible angle includes an angle between lines obtained by connecting each of boundary points of each pixel of the display from a reference position, wherein the reference angle includes an angle between lines obtained by connecting each of boundary points of any one pixel of the visible image from the reference position, and wherein the reference position is a position spaced apart by a radius corresponding to the user input radius of a curvature in a horizontal direction from a center position of the display.

6. The display device of claim 5, wherein the reference position is the position spaced apart by a predetermined distance from the display, and wherein the predetermined distance is a radius corresponding to the input radius of curvature.

7. The display device of claim 5, wherein the controller is further configured to correct brightness of said each pixel based on the obtained scaling ratio for said each pixel.

8. The display device of claim 7, wherein the controller is further configured to calculate a brightness correction coefficient based on the obtained scaling ratio, and correct the brightness of said each pixel based on the calculated brightness correction coefficient.

9. The display device of claim 7, wherein the controller is configured to brighten a pixel in response to the obtained scaling ratio being larger than a first ratio and to darken the pixel in response to the obtained scaling ratio being less than a second ratio.

10. The display device of claim 5, wherein the controller is further configured to adjust scaling ratios of the plurality of areas based on an average ratio of the scaling ratios of the plurality of pixels.

11. The display device of claim 5, wherein the display comprises a flat display panel.

12. The display device of claim 11, wherein the controller is configured to control the flat display panel to display the visible image corresponding to the input radius of curvature.

13. The display device of claim 5, wherein the display comprises a curved display panel having a predetermined radius of curvature.

14. The display device of claim 13, wherein the controller is configured to control the curved display panel to display the visible image having a radius of curvature different from the predetermined radius of curvature of the curved display panel.

15. A method of controlling a display device, comprising:
receiving an image;
receiving a user input of a radius of curvature for the image to be displayed;
obtaining a scaling ratio of each pixel in the received image based on the user input of the radius of curvature of a visible image shown to a user;
performing image processing of the image based on the obtained scaling ratio; and
displaying the processed image,
wherein the obtaining of the scaling ration for each pixel comprises:
confirming a reference position spaced apart by a predetermined distance from a display panel of the display device,
obtaining a visible angle between lines obtained by connecting each of boundary points of each pixel of the display panel from the reference position,
obtaining a reference angle between lines obtained by connecting each of boundary points of any one pixel of the visible image from the reference position, and
obtaining the scaling ratio of each of the plurality pixels based on the reference angle and the visible angle for each pixel, and
wherein the predetermined distance is a radius corresponding to the user input radius of curvature, and
wherein the reference position is a position spaced apart by a radius corresponding to the user input radius of curvature in a horizontal direction from a center position of the display panel.

16. The method of claim 15, further comprising:
calculating a brightness correction coefficient for said each pixel based on the obtained scaling ratio for said each pixel; and
correcting the brightness for said each pixel based on the calculated brightness correction coefficient for said each pixel.

17. The method of claim 16, wherein the correcting the brightness for said each pixel comprises:
adjusting the scaling ratios of the plurality of areas based on an average ratio of the obtained scaling ratios of the plurality of areas; and
correcting the brightness of said each pixel by applying the brightness correction coefficient to said each pixel in which the scaling ratio is adjusted.

18. The method of claim 15, further comprising:
adjusting the scaling ratios of the plurality of areas based on an average ratio of the scaling ratios of the plurality of areas.

19. The method of claim 15, wherein the obtaining the scaling ratio comprises controlling a flat display panel to display the visible image corresponding to the user input radius of curvature.

20. The method of claim 15, wherein the obtaining the scaling ratio comprises controlling a curved display panel to display the visible image having a radius of curvature different from the predetermined radius of curvature of the curved display panel.

21. The display device of claim 1, wherein
the controller, in response to the input interface receiving the mode selection of the two dimensional mode, performs the image processing of scaling the received image based on a reference scaling ratio different from the scaling in the three dimensional mode.

22. The display device of claim 5, wherein the display is a flat display panel and wherein the radius of curvature for the image to be displayed is selected from a displayed list of different radii of curvatures via the input interface.

* * * * *